United States Patent
Rekimoto

(10) Patent No.: US 9,535,307 B2
(45) Date of Patent: Jan. 3, 2017

(54) LIGHT SHIELDING DEVICE, LIGHT SHIELDING METHOD, AND PROGRAM

(71) Applicant: SONY CORPORATION, Tokyo (JP)

(72) Inventor: Junichi Rekimoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/405,206

(22) PCT Filed: Jul. 4, 2013

(86) PCT No.: PCT/JP2013/068322
§ 371 (c)(1),
(2) Date: Dec. 3, 2014

(87) PCT Pub. No.: WO2014/010498
PCT Pub. Date: Jan. 16, 2014

(65) Prior Publication Data
US 2015/0160528 A1   Jun. 11, 2015

(30) Foreign Application Priority Data

Jul. 12, 2012 (JP) ................................ 2012-156189

(51) Int. Cl.
*G02F 1/17* (2006.01)
*G03B 21/56* (2006.01)
(Continued)

(52) U.S. Cl.
CPC . *G02F 1/17* (2013.01); *E06B 9/24* (2013.01); *G03B 21/56* (2013.01);
(Continued)

(58) Field of Classification Search
CPC ................. G02F 2001/13756; H04N 1/00129; H04N 5/23296; G03B 21/56
See application file for complete search history.

(56) References Cited

U.S. PATENT DOCUMENTS 5,678,089 A * 10/1997 Bacs, Jr. .............. G02B 27/646
348/135

FOREIGN PATENT DOCUMENTS

JP   61-22897 U   2/1986
JP   7-19717 A    1/1995
(Continued)

OTHER PUBLICATIONS

International Search Report issued Sep. 3, 2013 in PCT/JP2013/068322.

*Primary Examiner* — Ahmed A Berhan
(74) *Attorney, Agent, or Firm* — Chip Law Group

(57) ABSTRACT

Provided is a light shielding device including a light shielding wall configured to include a plurality of panels, the light shielding wall being used as a partition of a first space and a second space, the plurality of panels being controllable in either a light transmission state in which light is transmitted or a light shielding state in which light is shielded, an optical path specifying unit configured to specify a predetermined optical path to be passed through the light shielding wall, a panel specifying unit configured to specify a panel on the light shielding wall, the panel being corresponded to a position at which the predetermined optical path specified by the optical path specifying unit passes through the light shielding wall, and a controller configured to control a light transmission state or a light shielding state for the plurality of panels on the light shielding wall.

15 Claims, 18 Drawing Sheets

(51) Int. Cl.
*E06B 9/24* (2006.01)
*G02F 1/13* (2006.01)
(52) U.S. Cl.
CPC .......... *E06B 2009/2405* (2013.01); *E06B 2009/2417* (2013.01); *E06B 2009/2464* (2013.01); *G02F 1/1313* (2013.01)

(56) References Cited

FOREIGN PATENT DOCUMENTS

| | | | |
|---|---|---|---|
| JP | 7-198245 A | 8/1995 |
| JP | 4031506 B2 | 1/2008 |
| JP | 2012-52339 A | 3/2012 |
| WO | WO 2010/100807 A1 | 9/2010 |

\* cited by examiner

LIGHT SHIELDING DEVICE, LIGHT SHIELDING METHOD, AND PROGRAM

TECHNICAL FIELD

The present technology relates to a light shielding device, a light shielding method, and a program, and more particularly to a light shielding device, light shielding method, and program, capable of hiding what is intended to be hidden and displaying intelligibly what is not desired to be viewed.

BACKGROUND ART

The technique for using an electronic blind that may be switched between a light transmission state and a light shielding state has been reported (see Patent Literature 1).

CITATION LIST

Patent Literature

Patent Literature 1: JP 4031506B

SUMMARY OF INVENTION

Technical Problem

However, when an electronic blind as disclosed in Patent Literature 1 is used, a wall or window is caused to be in a light transmission or shielding state as a whole. Thus if it is controlled to be in a light shielding state, then an area in which light is shielded as a whole may inevitably be in a state of being enclosed.

In addition, for example, a light shielding region is provided only at the line of sight of a walking person in a wall for partitioning a conference room and a corridor, and thus it is possible to relieve the state of being enclosed while blocking it from being viewed by a person who is walking along a corridor.

However, even so, it should be appreciated that a person present in the conference room is unable to look out through the range that is set as a region in which light is shielded.

The present technology is made in view of such circumstances, in particular, it is designed to hide what is intended to be in a state invisible to other people and to show what is desired to be viewed.

Solution to Problem

According to an aspect of the present technology, there is provided a light shielding device including a light shielding wall configured to include a plurality of panels, the light shielding wall being used as a partition of a first space and a second space, the plurality of panels being controllable in either a light transmission state in which light is transmitted or a light shielding state in which light is shielded, an optical path specifying unit configured to specify a predetermined optical path to be passed through the light shielding wall, a panel specifying unit configured to specify a panel on the light shielding wall, the panel being corresponded to a position at which the predetermined optical path specified by the optical path specifying unit passes through the light shielding wall, and a controller configured to control a light transmission state or a light shielding state for the plurality of panels on the light shielding wall based on information about a panel specified by the panel specifying unit.

The light shielding device may further include a start position specifying unit configured to specify a start position in the first space from which the predetermined optical path passes through the light shielding wall, and an end position specifying unit configured to specify an end position in the second space at which the predetermined optical path has passed through the light shielding wall. The optical specifying unit may specify the predetermined optical path based on information about the start position specified by the start position specifying unit and the end position specified by the end position specifying unit.

The light shielding device may include a first image capturing unit configured to capture an image of the first space, and a second image capturing unit configured to capture an image of the second space. The start position specifying unit may specify the start position in the first space from which the predetermined optical path passes through the light shielding wall based on the image captured by the first image capturing unit. The end position specifying unit may specify the end position in the second space at which the predetermined optical path has passed through the light shielding wall based on the image captured by the second image capturing unit.

The start position may be a position of eyes of a person in the first space and the end position may be a position of a target which is not intended to be viewed by a person in the second space. The controller may control a panel specified by the panel specifying unit to be in the light shielding state and controls other panels to be in the light transmission state.

The target which is not intended to be viewed by a person in the second space may include a predetermined object or a prescribed portion of a predetermined person, the predetermined object or the predetermined person being present in the second space.

The prescribed portion of the predetermined person may include a face, eyes, or a whole body of the predetermined person.

The start position may be a position of eyes of a person in the first space and the end position may be a position of a product which is intended to be viewed by the person in the second space. The controller may control a panel specified by the panel specifying unit to be in the light transmission state and controls other panels to be in the light shielding state.

The light shielding device may further include a sex determination unit configured to determine sex of a person in the first space, and a target sex determination unit configured to determine target sex that is sex of a person as a target for a product in the second space. The start position may be a position of eyes of a person in the first space and the end position may be a position of a product in which sex of the person corresponds with target sex of the product from among products which are intended to be viewed by the person in the second space.

The start position may be a position of a target which is not intended to be exposed to direct sunlight in the first space and the end position may be a position of a light source of sunlight from the second space. The optical path specifying unit, when a light source of the predetermined optical path is sunlight, may regard the sunlight as parallel light rays and may specify the predetermined optical path, based on information about a direction of a predetermined optical path using the sunlight as a light source and the start position. The controller may control a panel specified by the panel specifying unit to be in the light transmission state and may control other panels to be in the light shielding state.

The light shielding device may further include a projection unit configured to project an image onto a panel controlled to be in the light shielding state, the projection being performed for each of the panels.

The projection unit may project an image including a message onto the panel controlled to be in the light shielding state, the projection being performed for each of the panels.

The light shielding device may further include a third image capturing unit configured to capture an image when each panel of the light shielding wall is in the light transmission state in the first space, and an interpolated image generation unit configured to generate an interpolated image of a panel controlled to be in a light shielding state by the controller based on an image captured by the third image capturing unit. The projection unit may project the interpolated image onto the panel controlled to be in the light shielding state, the projection being performed for each of the panels.

The optical path specifying unit may specify a plurality of predetermined optical paths to be passed through the light shielding wall. The panel specifying unit may specify a plurality of panels on the light shielding wall, the plurality of panels being corresponded to positions at which the plurality of predetermined optical paths pass through the light shielding wall. The controller may control a light transmission state or a light shielding state for the plurality of panels on the light shielding wall based on information about a panel specified by the panel specifying unit.

According to an aspect of the present technology, there is provided a method for shielding light in a light shielding device provided with a light shielding wall configured to be used as a partition of a first space and a second space and configured to include a plurality of panels controllable in either a light transmission state in which light is transmitted or a light shielding state in which light is shielded, the method comprising the steps of performing an optical path specifying process of specifying a predetermined optical path to be passed through the light shielding wall, performing a panel specifying process of specifying a panel on the light shielding wall, the panel being corresponded to a position at which the predetermined optical path specified by performing the optical path specifying process passes through the light shielding wall, and performing a control process of controlling a light transmission state or a light shielding state for the plurality of panels on the light shielding wall based on information about a panel specified by performing the panel specifying process.

According to an aspect of the present technology, there is provided a program for causing a computer, which controls a light shielding device provided with a light shielding wall configured to be used as a partition of a first space and a second space and configured to include a plurality of panels controllable in either a light transmission state in which light is transmitted or a light shielding state in which light is shielded, to execute the processing of an optical path specifying step of specifying a predetermined optical path to be passed through the light shielding wall, a panel specifying step of specifying a panel on the light shielding wall, the panel being corresponded to a position at which the predetermined optical path specified by performing a process of the optical path specifying step passes through the light shielding wall, and a control step of controlling a light transmission state or a light shielding state for the plurality of panels on the light shielding wall based on information about a panel specified by performing a process of the panel specifying step.

In an aspect of the present technology, a predetermined optical path is specified so that the optical path passes through a light shielding wall which is used as a partition of a first space and a second space and is configured to include a plurality of panels capable of being controlled to be in either a light transmission state in which light is transmitted or a light shielding state in which light is shielded, a panel on the light shielding wall which corresponds to a position at which the specified predetermined optical path passes through the light shielding wall is specified, and the plurality of panels on the light shielding wall are controlled to be in either the light transmission state or the light shielding state based on information about the specified panel.

A light shielding device according to the present technology may be a separate device, or may be a block that performs a light shielding process.

Advantageous Effects of Invention

According to an aspect of the present technology, it is possible to allow what is desired to be hidden in a way that is not viewed to be invisible and allow what is desired to be viewed to be visible.

DESCRIPTION OF EMBODIMENTS

The preferred embodiments for carrying out the invention (hereinafter, referred to as embodiment) will be described below. The description is made in the following order.

1. First Embodiment (example of allowing what is not desired to be viewed to be invisible)
2. Second Embodiment (example of allowing what is desired to be viewed to be visible to a person who is supposed to view)
3. Third Embodiment (example of displaying message on light shielding region)
4. Fourth Embodiment (example of displaying interpolation image based on adjacent image on light shielding region)

1. First Embodiment

Exemplary Configuration According to First Embodiment of Light Shielding Device

Figure 1:
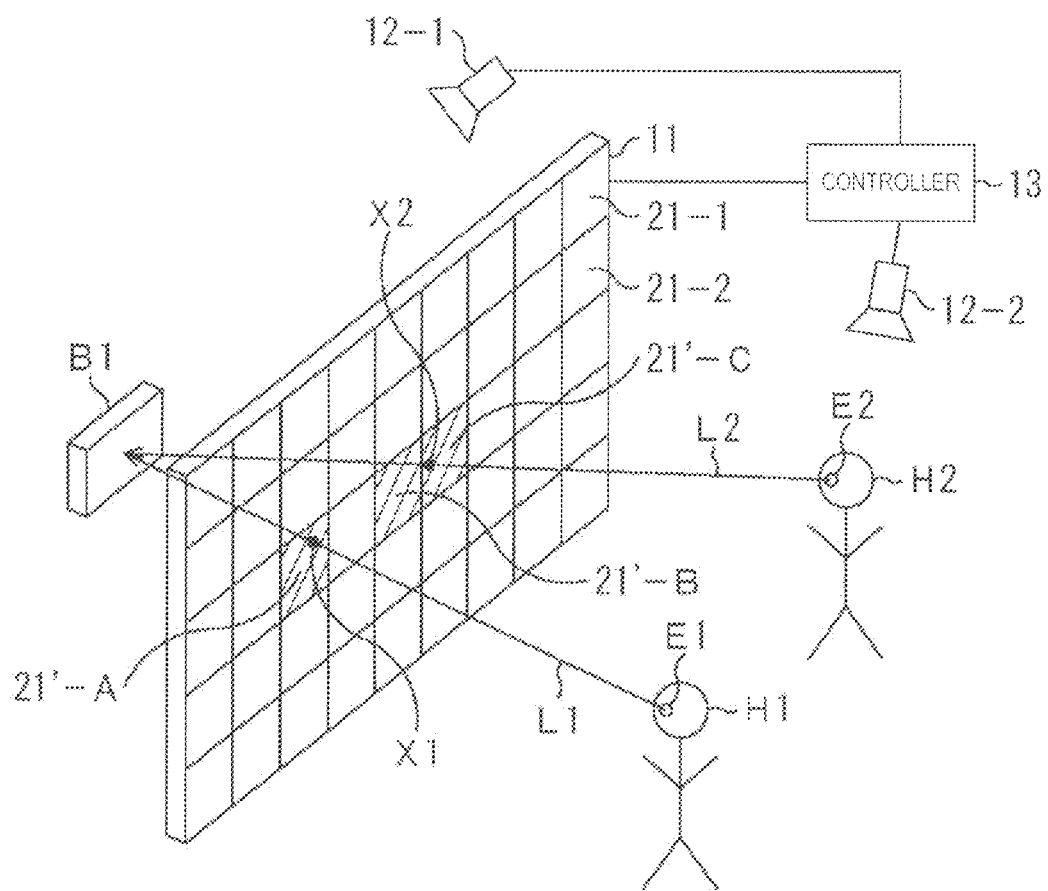
FIG. 1 is a diagram illustrating an exemplary configuration according to a first embodiment of a light shielding device to which the present technology is applied.

FIG. 1 illustrates an exemplary configuration according to a first embodiment of a light shielding device to which the present technology is applied. The light shielding device of FIG. 1 includes a light shielding wall 11, which is used as a partition of a first space on the left side in the figure and a second space on the right side in the figure and is configured to include a plurality of panels 21 capable of being controlled to be in two states of a light shielding state and a light transmission state, and thus the light shielding device controls only a panel 21 of a region at which is able to view directly an object B1 present in the first space from the point of views of persons H1 and H2 present in the second space to be in the light shielding state, and controls a panel 21 of the other regions to be in the light transmission state. In other words, the light shielding device of FIG. 1 is designed to allow what is not desired to be viewed to be invisible.

More specifically, the light shielding device of FIG. 1 is configured to include the light shielding wall 11, cameras 12-1 and 12-2, and a controller 13. The light shielding wall 11 is used as a partition of the first space shown on the left side in the figure and the second space shown on right side in the figure. As illustrated in FIG. 1, there is present in the first space an object B1 that is not desired to be viewed (it is desired to hide in a state of being invisible) by the persons H1 and H2 who are present in the second space. On the other hand, the second space is a space in which a person (for example, person H1, H2 or the like) can freely move.

Figure 2:
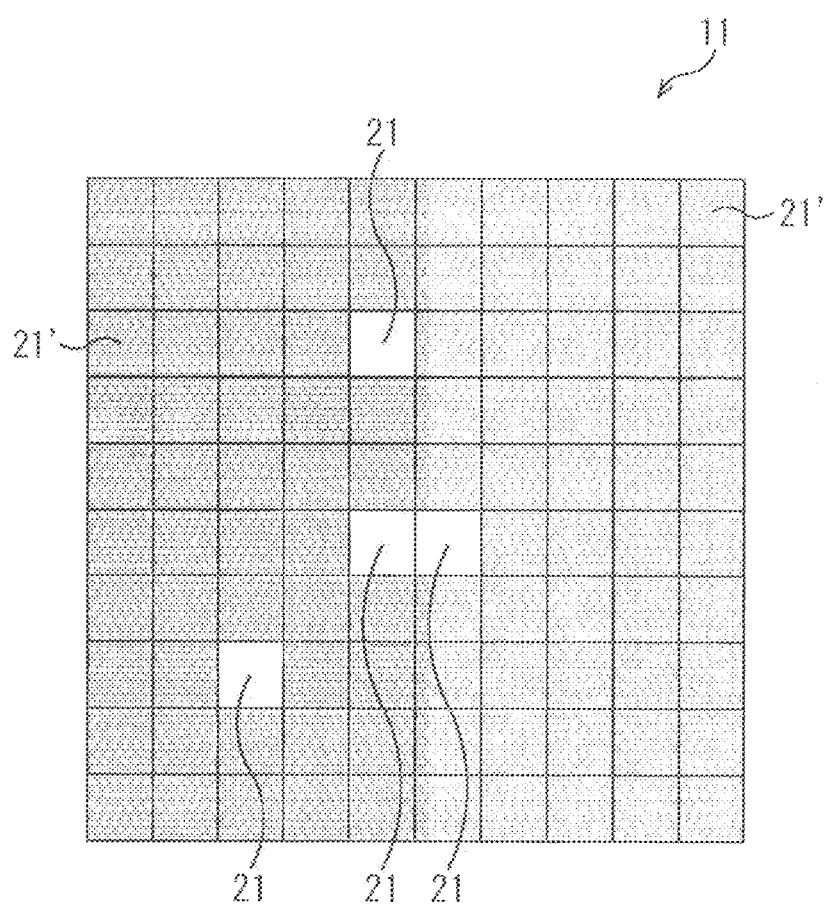
FIG. 2 is a diagram illustrating an exemplary configuration of a light shielding wall of FIG. 1.

The light shielding wall 11 is configured to include, for example, a plurality of panels 21, as illustrated in FIG. 2. The panel 21 is, for example, a liquid crystal panel having a size of approximately 10 cm×10 cm and is controlled to be in either a light shielding state or a light transmission state by the controller 13. The panel 21 is not limited to a size of approximately 10 cm×10 cm, and the panel 21 may be smaller or larger than the size. In addition, FIG. 2 illustrates the panel 21 having an exemplary rectangular shape, but the panel may have a non-rectangular shape and other shapes. In addition, the panel 21 may be composed of those other than a liquid crystal panel as long as it can be controlled to be in either a light shielding state or a light transmission state.

When the panel 21 is in a light shielding state, if a person looks at the panel 21 with the naked eyes, the panel 21 is in a state where an object on the opposite side of the panel 21 is unable to be recognized (viewed). In addition, when the panel 21 is in a light transmission state, if a person looks at the panel 21 with the naked eyes, then the panel 21 is in a state where an object on the opposite side of the panel 21 is able to be recognized (viewed). In FIG. 2, a panel 21 which is in a light transmission state is denoted by "panel 21", and a panel 21 which is in a light shielding state is denoted by "panel 21'".

More specifically, when the light shielding wall 11 is place on the front side and a conference room is present behind the light shielding wall 11, if the panel 21 is controlled to be in a light shielding state, the panel 21 is in a state where the inside of the conference room is invisible (state that is unable to be visually recognized) as shown in a region W1 surrounded by the dotted line in FIG. 2. In addition, as shown in regions other than the region W1, if the panels 21 are controlled to be in a light transmission state, the panels 21 are in a state where the inside of the conference room is visible (state that is able to be visually recognized).

The cameras 12-1 and 12-2 capture an image of the first and second spaces described above, respectively, and supply the captured image to the controller 13. In this case, the cameras 12-1 and 12-2 capture an image including data on the distance from the cameras 12-1 and 12-2 in a space in an image of a captured subject for each pixel while capturing the image. In other words, the cameras 12-1 and 12-2 have a camera function referred to as so-called depth camera. Thus, the image captured by the cameras 12-1 and 12-2 includes information on the distance from the cameras 12-1 and 12-2 to the subject in units of pixel in addition to a normal image. In the following description, the information on the distance in units of pixel is referred to as distance image. Thus, the cameras 12-1 and 12-2 generate a distance image as well as capture a normal image, and then supply it to the controller 13.

The controller 13 acquires the image of the first space and the image of the second space supplied respectively from the cameras 12-1 and 12-2. The controller 13 recognizes the position of the object B1 in the first space based on the image of the first space and information about the installation position and orientation of the camera 12-1. In addition, the controller 13 specifies the positions E1 and E2 of the eyes of the respective persons H1 and H2 by which the object B1 is not desired to be viewed based on the image of the second space and information about the installation position and direction of the camera 12-2. Furthermore, the controller 13 obtains optical paths L1 and L2 extending from the positions E1 and E2 of the eyes of the respective persons H1 and H2 by which the object B1 is not desired to be viewed to the object B1, which are also referred to as a path of the line of sight when viewing the object B1 from the positions E1 and E2 of the eyes of the respective persons H1 and H2 by which the object B1 is not desired to be viewed.

Figure 3:
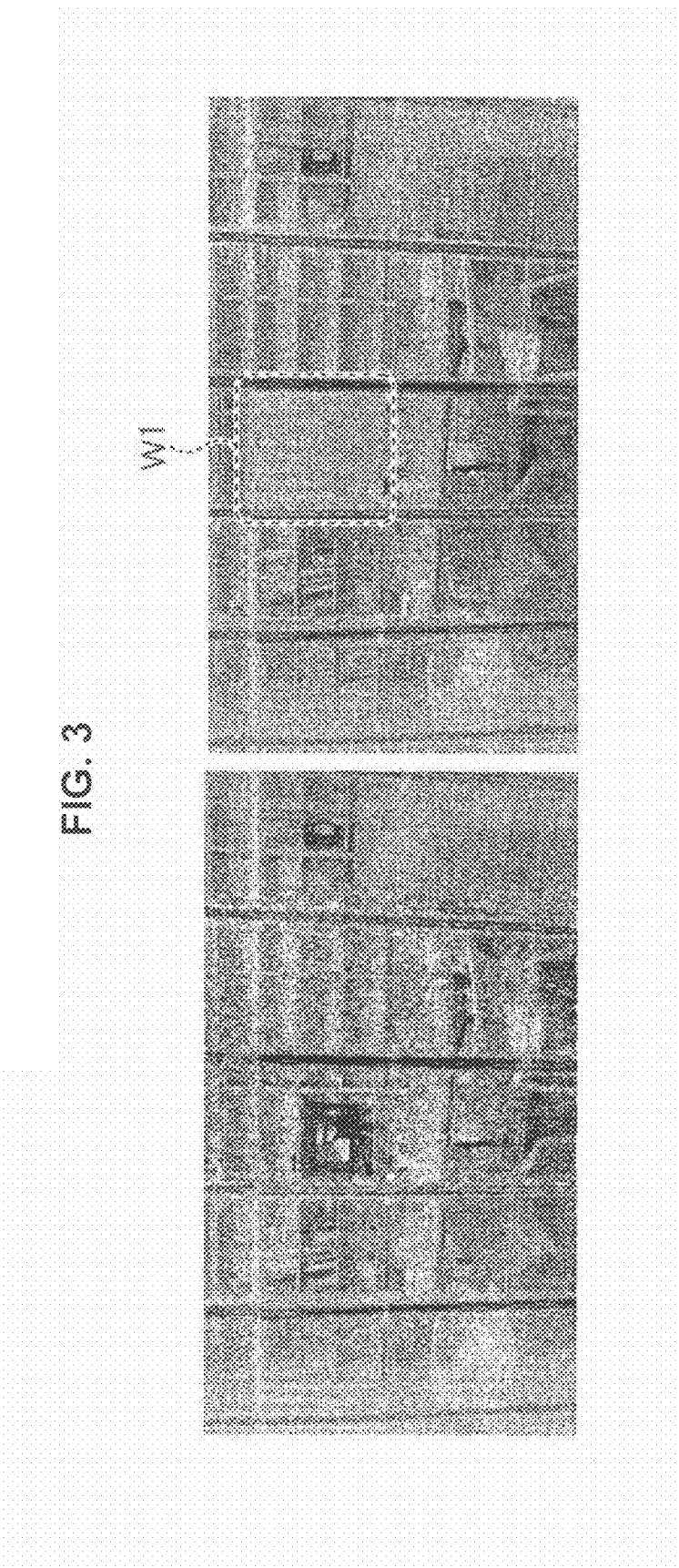
FIG. 3 is a diagram illustrating a light shielding state and a light transmission state of a panel on the light shielding wall.

Moreover, the controller 13 controls a panel 21 including an intersection point with the optical paths L1 and L2 among the panels 21 on the light shielding wall 11 to be in a light shielding state and controls other panels 21 to be in a light transmission state. This control enables the second space to be brighter and maintained as the space with a sense of openness while maintaining the state where B1 present in the first space is invisible to the persons H1 and H2 present in the second space. In other words, in the light transmission state, for example, a room on the other side of the light shielding wall 11 is able to be viewed over the light shielding wall 11 as shown in the left portion of FIG. 3. On the other hand, as shown in the region W1 in the left portion of FIG. 3, in the light shielding state, the inside of the room on the other side of the light shielding wall 11 is unable to be viewed.

In FIG. 1, although the optical path is represented as the line of sight when the eyes E1 and E2 of the respective persons H1 and H2 are assumed to be a point of view, the optical path may be represented as a path along which light is transmitted through the light shielding wall 11 or light is shielded by the light shielding wall 11. Thus, the optical path may not necessarily indicate the line of sight, but for example, the optical path may be referred to as an optical path indicating a path of the rays of the sun as a light source. In the following description, the path of light which transmits through the light shielding wall 11 when each panel 21 on the light shielding wall 11 is controlled to be in a light transmission state is collectively referred to as optical path.

[Exemplary Configuration of Implementation of Controller of FIG. 1]

Subsequently, referring to the block diagram of FIG. 4, there will be described an exemplary configuration of the controller 13 in a light shielding device of FIG. 1, which allows what is not desired to be viewed to be invisible.

The controller 13 is configured to include image acquisition units 51-1 and 51-2, an optical path start position measurement unit 52, an optical path end position measurement unit 53, an optical path calculation unit 54, a wall transmission position calculation unit 55, a light shielding position specifying and storing unit 56, and a light shielding control unit 57.

The image acquisition unit 51-1 acquires an image of the first space and a distance image that are supplied from the camera 12-1, and the image acquisition unit 51-2 acquires an image of the second space and a distance image that are supplied from the camera 12-2. The image acquisition units 51-1 and 51-2 supply an acquired image to the optical path end position measurement unit 53 and the optical path start position measurement unit 52, respectively.

The optical path start position measurement unit 52 measures a start point of the optical path in the second space supplied from the image acquisition unit 51-2, that is, measures the position of eyes E1 and E2 of the respective persons H1 and H2 in the second space as a start point of each of the optical paths L1 and L2, as illustrated in FIG. 1. More specifically, the optical path start position measurement unit 52 detects the position of the persons H1 and H2 by using a facial image detection process, extracts an organ such as eyes, nose, mouth, and ears from a facial image of the detected person by using an organ extraction process, and measures an optical path start position in association with the position of the camera 12-2 from distance information on the distance image corresponding to a pixel indicating the position of eyes from among extracted organs. Then, the optical path start position measurement unit 52 supplies information about the measured optical path start position to the optical path calculation unit 54.

The optical path end position measurement unit 53 measures an end point of the optical path in the first space supplied from the image acquisition unit 51-1, that is, measures the position of the object B1 in the first space as an end point of each of the optical paths L1 and L2, as illustrated in FIG. 1. More specifically, the optical path end position measurement unit 53 searches the object B1 in the image based on, for example, the previously inputted information such as a shape or color used to specify the object B1 which is intended to be invisible to the persons H1 and H2 or the like. Then, the optical path end position measurement unit 53 specifies an optical path end position in association with the position of the camera 12-1 from distance information on the distance image corresponding to a pixel in the position of the searched object B1.

The optical path calculation unit 54 calculates an optical path based on information about the optical path start position supplied from the optical path start position measurement unit 52 and information about the optical path end position supplied from the optical path end position measurement unit 53, and the optical path calculation unit 54 supplies information about the calculated optical path to the wall transmission position calculation unit 55.

The wall transmission position calculation unit 55 calculates, as the wall transmission position, a position on the light shielding wall 11 through which the optical path passes, based on the information about the optical path supplied from the optical path calculation unit 54.

The light shielding position specifying and storing unit 56 specifies and stores the position of a panel 21 through which the optical path passes from among the panels 21 constituting the light shielding wall 11 based on the information about the wall transmission position on the light shielding wall 11. More specifically, the light shielding position specifying and storing unit 56 specifies and stores a panel 21 that corresponds to the coordinates of the wall transmission position based on the wall transmission position information.

The light shielding control unit 57 controls each of the panels 21 on the light shielding wall 11 to be in either a light shielding state or a light transmission state based on information about a panel 21 necessary to be light-shielded, which is stored in the light shielding position specifying and storing unit 56.

Figure 4:
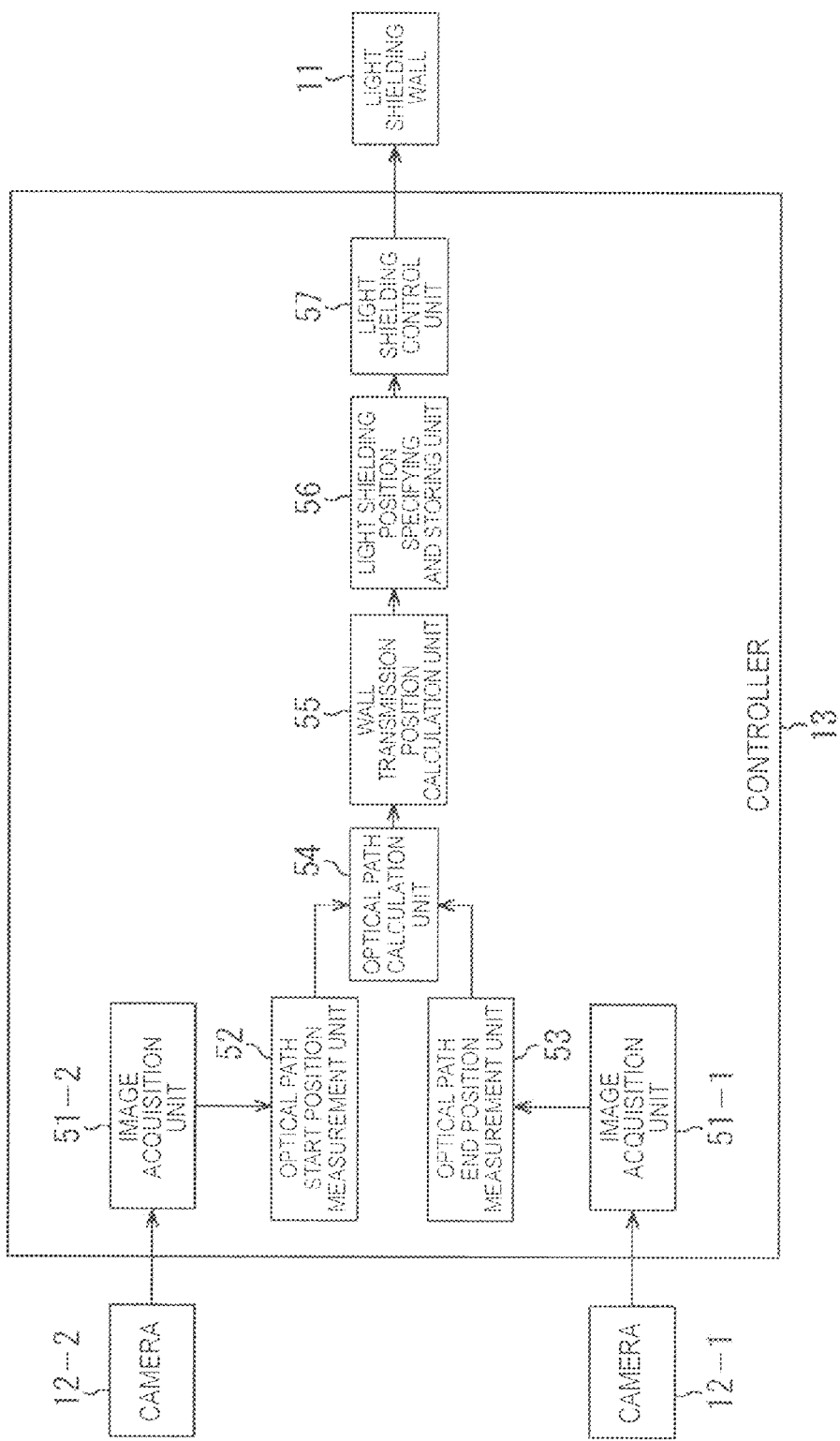
FIG. 4 is a block diagram illustrating an exemplary configuration of a controller of FIG. 1.

[Process of Controlling Light Shielding Wall by Controller of FIG. 4]

Subsequently, referring to the flowchart of FIG. 5, a process of controlling the light shielding wall 11 by the controller 13 of FIG. 4 will be described. Each of the panels 21 on the light shielding wall 11 is controlled to be in the light transmission state by default, but it may be controlled to be in the light shielding state.

In step S11, the camera 12-2 captures an image in the direction that is a start point of an optical path in the second space and supplies the captured image and a distance image to the image acquisition unit 51-2.

In step S12, the camera 12-1 captures an image in the direction that is an end point of an optical path in the first space and supplies the captured image and a distance image to the image acquisition unit 51-1.

In step S13, the image acquisition unit 51-2 acquires the captured image and the distance image supplied from the camera 12-2 and supplies the acquired image to the optical path start position measurement unit 52.

In step S14, the image acquisition unit 51-1 acquires the captured image and the distance image supplied from the camera 12-1 and supplies the acquired image to the optical path end position measurement unit 53.

In step S15, the optical path start position measurement unit 52 determines whether there is a person that constitutes an optical path start point based on the supplied captured image and distance image, and the optical path end position measurement unit 53 determines whether there is an object that constitutes an optical path end point based on the supplied captured image and distance image. In other words, the optical path start position measurement unit 52 determines whether there is a person constituting the optical path start point based on whether a facial image is detected by performing a facial detection process based on the image in the second space. In addition, the optical path end position measurement unit 53 searches an object B1 based on information that is inputted as information about the specification of the object B1 based on the image in the first space, and determines whether there is an object constituting the optical path end point based on whether the object B1 is searched. In step S15, if an object and a person constituting the optical path start point and the optical path end point, respectively, are not detected and they are not included in the image, then the process returns to step S11.

In other words, for example, if an object B1 is not searched in the first space, then there is nothing to be hidden and made invisible to a person H1 or H2, thus all the panels 21 of the light shielding wall 11 can be remained to be controlled in the light transmission state, accordingly the subsequent steps are not necessary to perform and the process returns to its original state of step S11. In addition, similarly, if a person H1 or H2 is not searched in the second space, then there is no person H1 or H2 even if an object B1 is present, thus all the panels 21 of the light shielding wall 11 can be still remained to be controlled in the light transmission state, accordingly the subsequent steps are not necessary to perform and the process returns to its original state of step S11. As a result, the process of steps S11 to S15 is repeated until the object B1 and the person H1 or H2 are both captured by the camera 12-1 and 12-2, respectively.

In step S15, for example, if the object B1 and the person H1 or H2 are searched, the process proceeds to step S16.

In step S16, the optical path start position measurement unit 52 specifies the position of the person H1 or H2 by using a facial image detection process. Furthermore, the optical path start position measurement unit 52 extracts an organ such as eyes, nose, mouth, and ears from an facial image of the detected person by using an organ extraction process, and measures an optical path start position in association with the position of the camera 12-2 from distance information on the distance image corresponding to a pixel indicating the position of eyes from among extracted organs. Then, the optical path start position measurement unit 52 supplies information about the measured optical path start position to the optical path calculation unit 54.

In step S17, the optical path end position measurement unit 53 specifies an optical path end position in association with the position of the camera 12-1 from the distance information on the distance image that corresponds to a pixel in the position of the searched object B1. As long as the object B1 has such a size that there is no problem when the object B1 is considered to be a dot shape, the end point may be one point or several points in the vicinity of the point, and for example, if it has a large surface area, then a plurality of end points may be set as a whole. In this case, the optical path end position measurement unit 53 supplies all the information about the plurality of measured optical path end positions to the optical path calculation unit 54.

In step S18, the optical path calculation unit 54 calculates an optical path based on the information about the optical path start position supplied from the optical path start position measurement unit 52 and the information about the optical path end position supplied from the optical path end position measurement unit 53, and the optical path calculation unit 54 supplies information about the calculated optical path to the wall transmission position calculation unit 55. As described above, in some cases, a plurality of optical path end positions may be obtained depending on the size of the object B1, and thus a plurality of optical paths may be obtained as well. In this case, the optical path calculation unit 54 supplies all the information about the plurality of optical paths to the wall transmission position calculation unit 55.

In step S19, the wall transmission position calculation unit 55 calculates a position on the light shielding wall 11 through which the optical path passes based on the information about the optical path supplied from the optical path calculation unit 54. In other words, the optical path can be considered as a vector that is specified by the start point and the end point, and the light shielding wall 11 can be considered to be a plane. Thus, the wall transmission position calculation unit 55 obtains a wall transmission position, which is an intersection point of a straight line specified by the vector corresponding to each optical path and a plane constituting the light shielding wall 11, as coordinate information indicating a position on the light shielding wall 11, and then the wall transmission position calculation unit 55 supplies the coordinate information indicating the position on the light shielding wall 11 that is the obtained wall transmission position to the light shielding position specifying and storing unit 56. In other words, in the case of FIG. 1, the wall transmission position is a position X1 for the optical path L1 and similarly a position X2 for the optical path L2.

In step S20, the light shielding position specifying and storing unit 56 specifies and stores the position of a panel 21 corresponding to the wall transmission position of the optical path from among the panels 21 constituting the light shielding wall 11 based on information about the wall transmission position on the light shielding wall 11. More specifically, the light shielding position specifying and storing unit 56 specifies a panel 21 to which the coordinates of the wall transmission position belong based on the wall transmission position information. In other words, in the case of FIG. 1, the panel 21 to which the wall transmission position X1 belongs is a panel 21'-A. Similarly, the panel 21 to which the wall transmission position X2 belongs is a panel 21'-B. Furthermore, in the case of FIG. 1, in the optical path L2 that is the line of sight of the person H2, the wall transmission position is located at the left end of the panel 21'-B, and if a panel adjacent thereto is not light-shielded, then the object B1 may be visible, thus a panel 21'-C is regarded as a panel that is necessary to be light-shielded. In other words, the light shielding position specifying and storing unit 56 regards not only a panel to which the wall transmission position belongs but also a panel 21 adjacent thereto if necessary as a panel 21 that is necessary to be light-shielded, and stores these panels.

In step S21, the light shielding control unit 57 sets an unprocessed panel 21 from among the panels 21 on the light shielding wall 11 as a panel to be processed.

In step S22, the light shielding control unit 57 determines whether a panel to be processed is a panel 21 that belongs to the wall transmission position based on the light shielding position information that is stored in the light shielding position specifying and storing unit 56. For example, in step S22, if the panel 21 to be processed is a panel 21 that belongs to the wall transmission position or a panel 21 adjacent thereto, then in step S23, the light shielding control unit 57 controls so that the panel 21 to be processed may be in a light shielding state. On the other hand, in step S22, if the panel 21 to be processed is not a panel 21 that belongs to the wall transmission position, then in step S24, the light shielding control unit 57 controls so that the panel 21 to be processed may be in a light transmission state.

In step S25, the light shielding control unit 57 determines whether there is an unprocessed panel 21, and if it is determined that there is an unprocessed panel 21, then the process returns to step S21. In other words, the process of steps S21 to S25 is repeated until all the panels 21 are controlled to be any one of the light shielding state and the light transmission state. Then, in step S25, if it is determined that there is no unprocessed panel 21, the process proceeds to step S26.

In step S26, the controller 13 determines whether there is an instruction to end the process of controlling the light shielding wall, and if it is determined that there is no instruction, then the process returns to step S11. In other words, the process of steps S11 to S26 is repeated until there is an instruction to end the process. In step S26, if it is determined that there is an instruction to end the process, and then the process ends.

According to the process described above, in two spaces partitioned by the light shielding wall 11 as illustrated in FIG. 1, for example, the panel 21'-A in the light-shielding wall 11 on the optical path L1 that corresponds to the line of sight of the eyes E1 of the person H1 present in the second space is controlled to be in a light shielding state, resulting in the state where the object B1 is invisible to the person H1. Similarly, for example, if the person H1 is moved to the position of the person H2, the panel 21'-B in the light-shielding wall 11 on the optical path L2 that corresponds to the line of sight of the eyes E2 of the person H2 and the panel 21'-C adjacent to the panel 21'-B are controlled to be in the light shielding state, resulting in the state where the object B1 is invisible.

Moreover, in FIG. 1, if only the person H1 is present, then only the panel 21'-A is controlled to be in a light shielding state, and the panels 21'-B and 21'-C are controlled to be in a light transmission state. Then, if the person H1 is moved to the position of the person H2, the panel 21'-A is controlled to be in a light transmission state, and the panels 21'-B and 21'-C are controlled to be in a light shielding state. In other words, each state of the panel 21' controlled to be in a light shielding state and the panel 21 controlled to be in a light transmission state varies with the position of a person. Furthermore, if the persons H1 and H2 are present at the same time, then all the panels 21'-A to 21'-C are controlled to be in a light shielding state, and in the subsequent time, if the persons H1 and H2 are moved, then a panel 21' corresponding to the moved position is controlled to be in a light shielding state and the panels 21'-A to 21'-C are controlled to be in a light transmission state.

As a result, for example, if the first space is used as a conference room and the object B1 is made of a whiteboard on which the details of proceedings of conference are recorded, the whiteboard that is the object B1 is invisible to a person who goes through the second space that is the space outside the conference room. Thus, the revelation of the details of conference by stealing a look at the conference can be prevented. Furthermore, even when the details of proceedings of conference is made invisible as described above, a panel 21 of a region in which an optical path corresponding to the line of sight of the person H1 or H2 in the second space is not present is controlled to be in a light transmission state, and thus the range, which forms a boundary with the second space and is controlled to be in a light shielding state, can be reduced to a minimum necessary range in the second space that is the conference room, thereby forming the conference room with a sense of openness. The first space can be used as not only a conference room described above but also a space for other uses.

Figure 6:
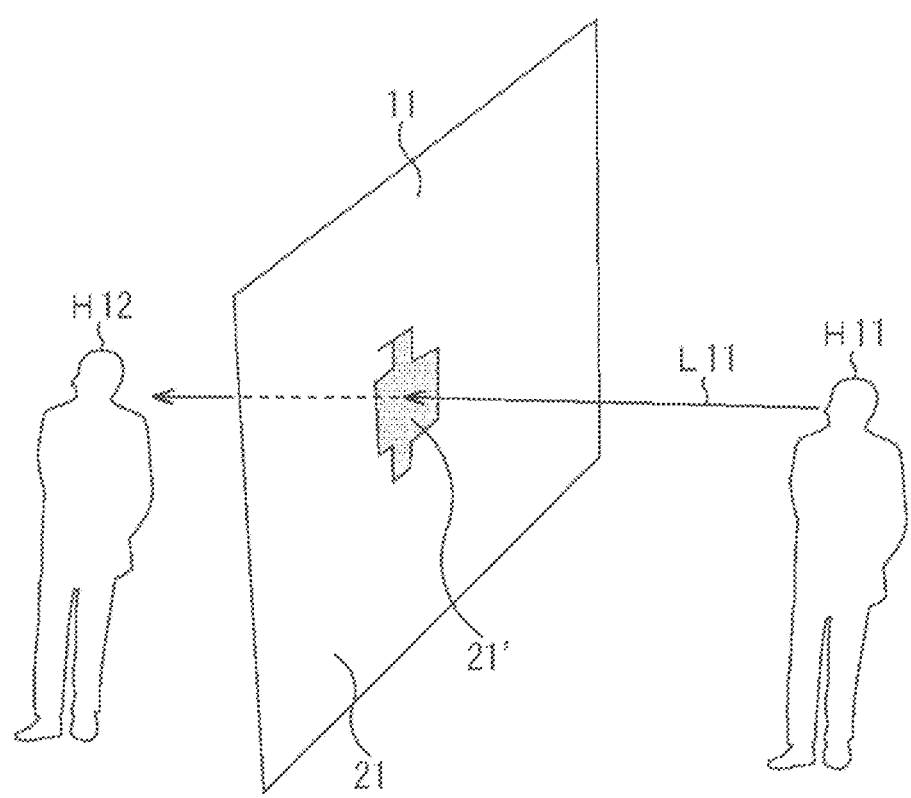
FIG. 6 is a diagram for describing an example in which, when the light shielding wall is used as a partition of two spaces, a person present in one space and a person present in the other space are prevented from making eye contact with each other.

In the above, there has been described an example in which the object B1 that is located in the first space is controlled in a state where it is invisible to a person in the second space, but for example, instead of the object B1, an optical path L11 that is the line of sight of the eyes of a person H12 in the first space may be set to be in a state in which it is invisible to a person H11 in the second space. Thus, as illustrated in FIG. 6, the major part of the light shielding wall 11 is controlled to be in a light transmission state, and thus the first space is a space with a sense of openness, but the persons present on the inside and outside of the light shielding wall are prevented from making eye contact with each other, thereby forming the conference room with a sense of openness without worrying about the eyes of others. Furthermore, the whole body of the person H12, instead of the object B1, in the first space is set to the end point of the optical path, thus it is possible that a figure of the person H12 in the first space is invisible to the person H11 in the second space. By doing so, although the person H11 in the second space may recognize that someone or the person H12 is present in the first space (even if the person H12 is invisible, the presence of someone can be recognized by the existence of the panel 21' having a light shielding state), who the person is or what clothes the person wears can be prevented from being recognized visually. Even by doing so, most of the panels 21 are controlled to be in a light transmission state, and thus it is possible to use the first space as a space with a sense of openness.

Figure 7:
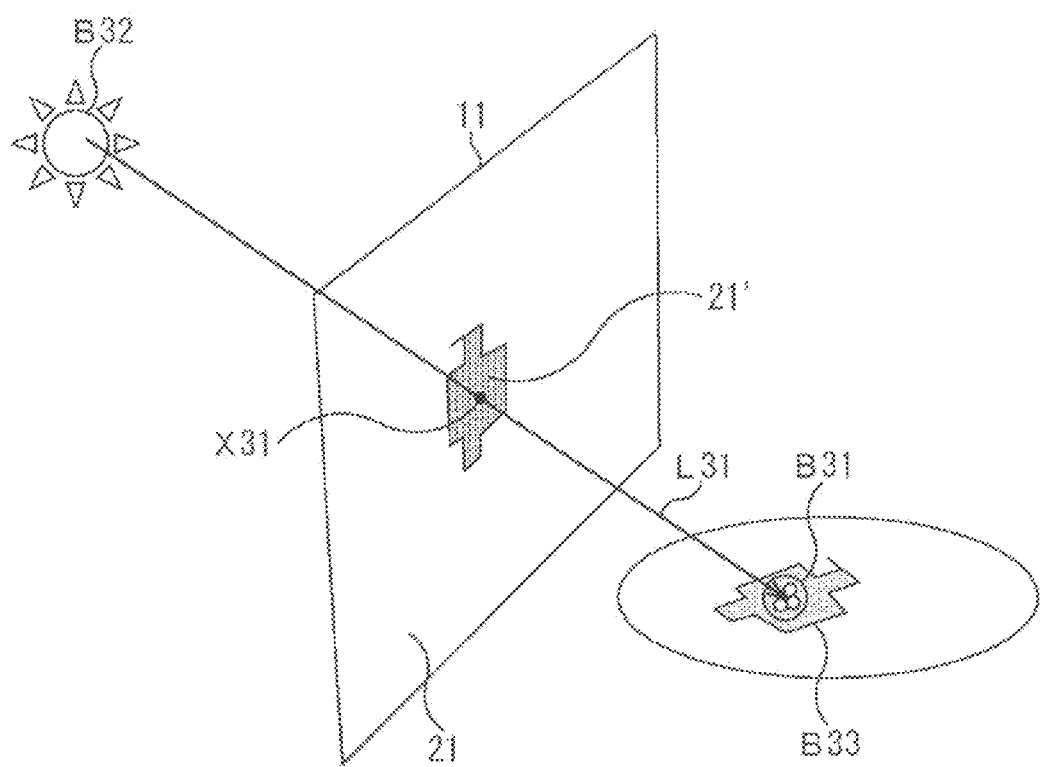
FIG. 7 is a diagram for describing an example in which, when the light shielding wall is used as a partition of two spaces, an object present in one space is prevented from being exposed to direct sunlight.

Moreover, in the above, there has been described an example in which an optical path is established between an object in the first space and the eyes of a person in the second space or between the eyes of a person in the first space and the eyes of a person in the second space and a panel that belongs to the position of the intersection point on the light shielding wall 11 of the established optical path is controlled to be in a light shielding state, but for example, as illustrated in FIG. 7, an optical path may be established between the position of the sun in the first space and the position of an object in the second space.

Figure 8:
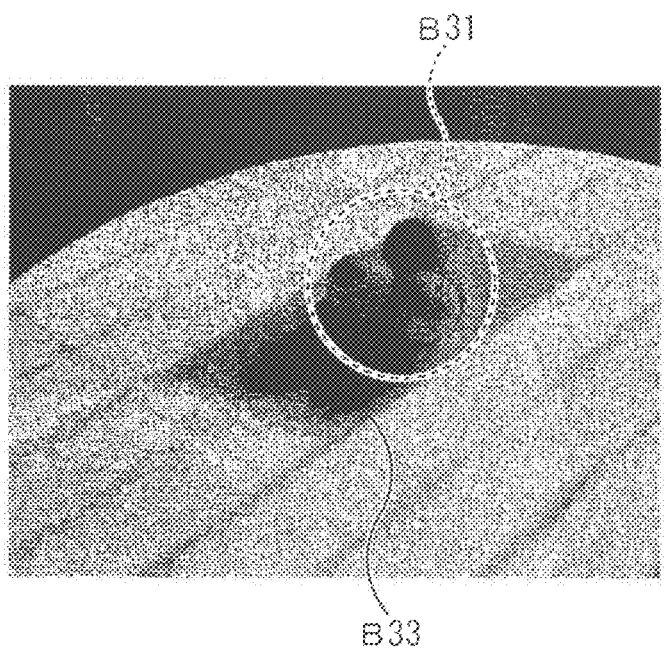
FIG. 8 is a diagram for describing an example in which, when the light shielding wall is used as a partition of two spaces, an object present in one space is prevented from being exposed to direct sunlight.

In other words, FIG. 7 illustrates an example in which an optical path L31 is established between the sun B32 in the first space and an object B31 such as a fruit in the second space. As illustrated in FIG. 7, a panel 21 that belongs to the position X31 of the intersection point with the optical path L31 in the light shielding wall 11 is controlled to be in a light shielding state, and thus as illustrated in FIG. 8, a shaded portion B33 is provided so as to avoid exposing the object B31 such as a fruit to direct sunlight from the sun B32, and the optical path L31 is changed with the movement of the sun B32, thus the state of the panel 21 controlled to be in a light shielding state is changed. Accordingly, the object B31 such as a fruit can be continuously prevented from being exposed to direct sunlight, thereby suppressing the decay of a fruit or the like. In addition, a person or the like, instead of the object B31 in FIG. 7, may be configured, and in this case, it is possible to avoid exposing the person to direct sunlight.

Figure 5:
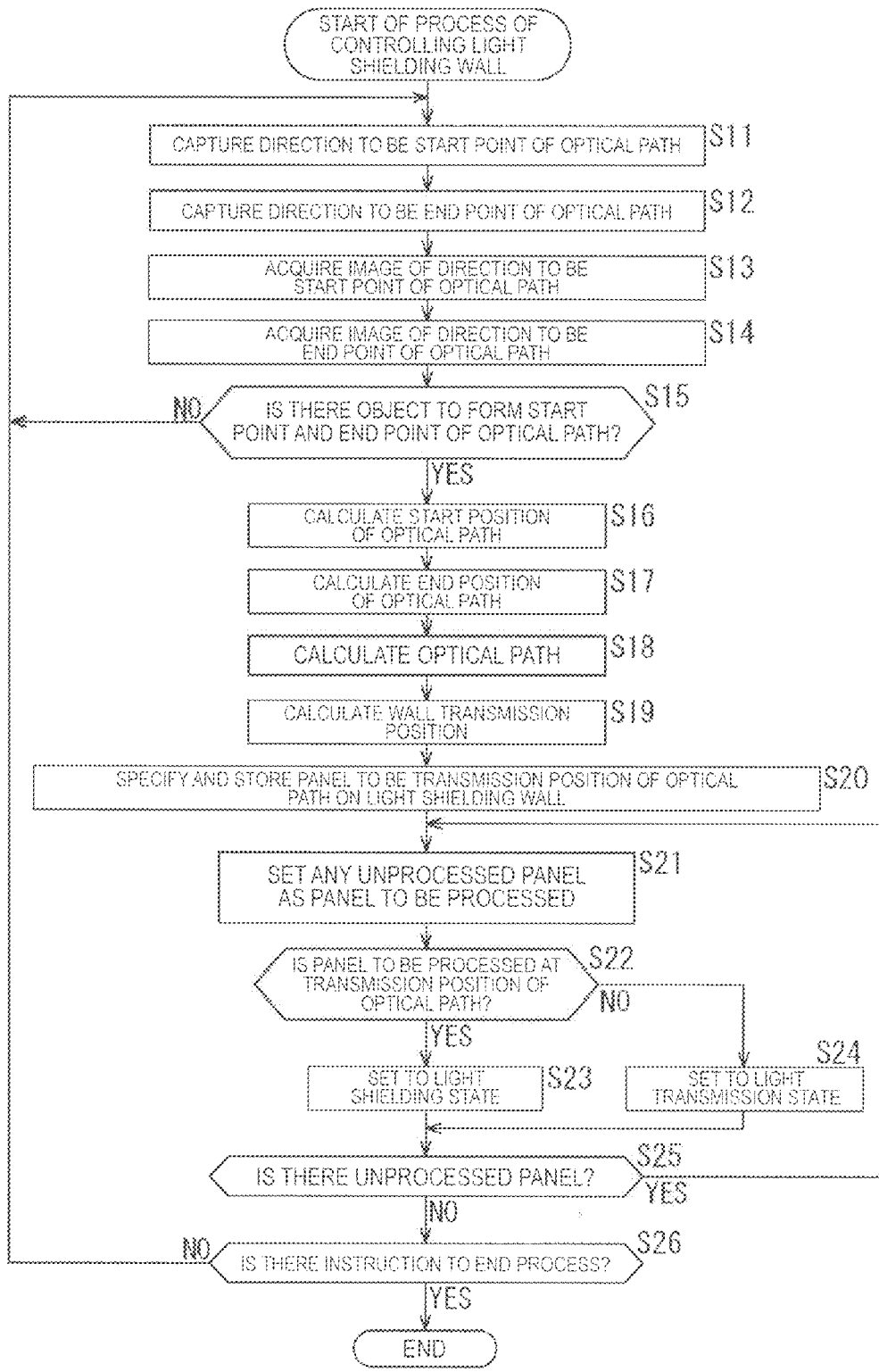
FIG. 5 is a flowchart for describing a light shielding wall control process performed by a controller of FIG. 1, when the light shielding wall is used as a partition of two spaces, which allows a predetermined object present in one space to be invisible to a person present in the other space.

The process of controlling the light shielding wall in the examples of FIGS. 6 to 8 is substantially similar to the process of FIG. 5 except that an object or a person that is the start and end points of the optical path in the process of FIGS. 6 to 8 is different from the process of FIG. 5, and thus description thereof will be omitted. However, sunlight may be regarded as parallel light and thus the determination of start position is unable to be performed strictly. However, in order to specify an optical path passing through the light shielding wall, it is sufficient to specify any one of the start and end points as long as the direction of an optical path of sunlight is obtained. In other words, in the example of FIG. 8, in specifying an optical path made of sunlight, it is sufficient to specify an optical path passing through the light shielding wall as long as the direction of an optical path of sunlight and the position information of the object B31 that is the end point are specified. In this case, in the example of employing sunlight as in FIG. 8, a process of determining the direction of an optical path of sunlight that is parallel light is performed instead of the process of specifying a start point of the optical path, and the process of specifying an optical path is performed by using information about an end point and the direction of an optical path of sunlight.

2. Second Embodiment

Exemplary Configuration According to Second Embodiment of Light Shielding Device There has been described in the above an example of the light shielding device which allows what is not desired to be viewed to be invisible, but by a similar function, what is desired to be viewed may be allowed to be visible to a person supposed to be viewed.

Figure 9:
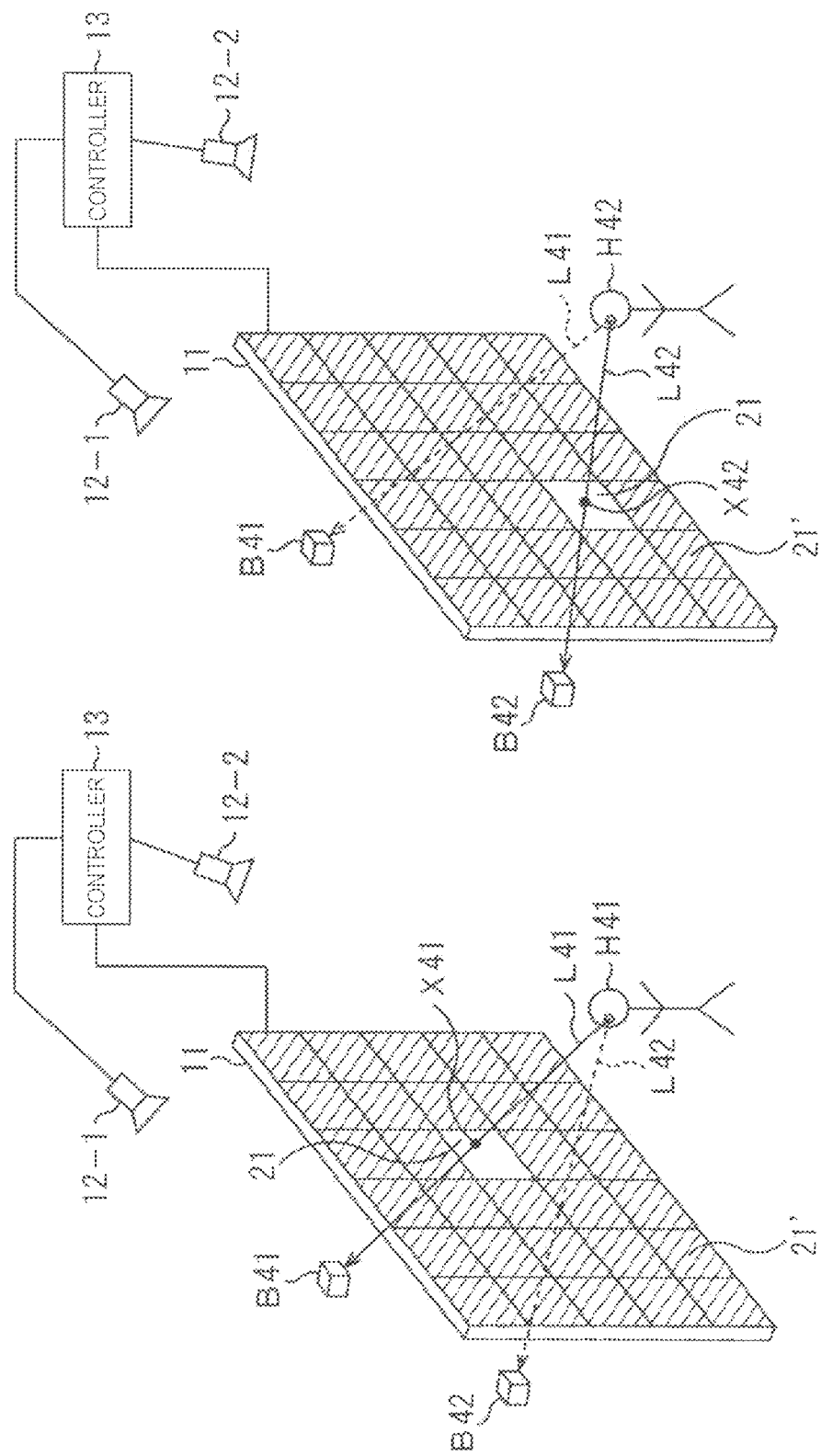
FIG. 9 is a diagram illustrating an exemplary configuration according to a second embodiment of a light shielding device to which the present technology is applied.

For example, it is considered a case in which the first space is set as a display window for displaying products for sale and the second space is set as a passage in front of the display window. In addition, it is assumed that a product for men B41 and a product for women B42 are present in a display window that is the first space, as respectively illustrated in the left and right portions of FIG. 9. In FIG. 9, the configuration that has substantially the same function as the configuration of FIG. 1 is indicated by the same name and reference numeral, and the description thereof is omitted as appropriate.

For example, as illustrated in the left portion of FIG. 9, a case where a person H41 who is a male is passing by in the second space is considered. In this case, if only a panel 21, which includes a position X41 that is the intersection point on the light shielding wall 11 in an optical path L41 corresponding to the line of sight of the person H41 to the product B41, is controlled to be in a light transmission state and other panels 21' are controlled to be in a light shielding state, only the product for men B41 can be visible to the person H41 who is a male.

Similarly, as illustrated in the right portion of FIG. 9, in a case in which a person H42 who is a female is passing by in the second space, if only a panel 21, which includes a position X42 that is the intersection point on the light shielding wall 11 in an optical path L42 corresponding to the line of sight of the person H42 to the product B42, is controlled to be in a light transmission state and other panels 21' are controlled to be in a light shielding state, only the product for women B42 can be visible to the person H42 who is a female.

As described above, it may be possible to allow what is desired to be viewed to be visible to a person who is supposed to be viewed.

[Exemplary Configuration of Implementation of Controller of FIG. 9]

Figure 10:
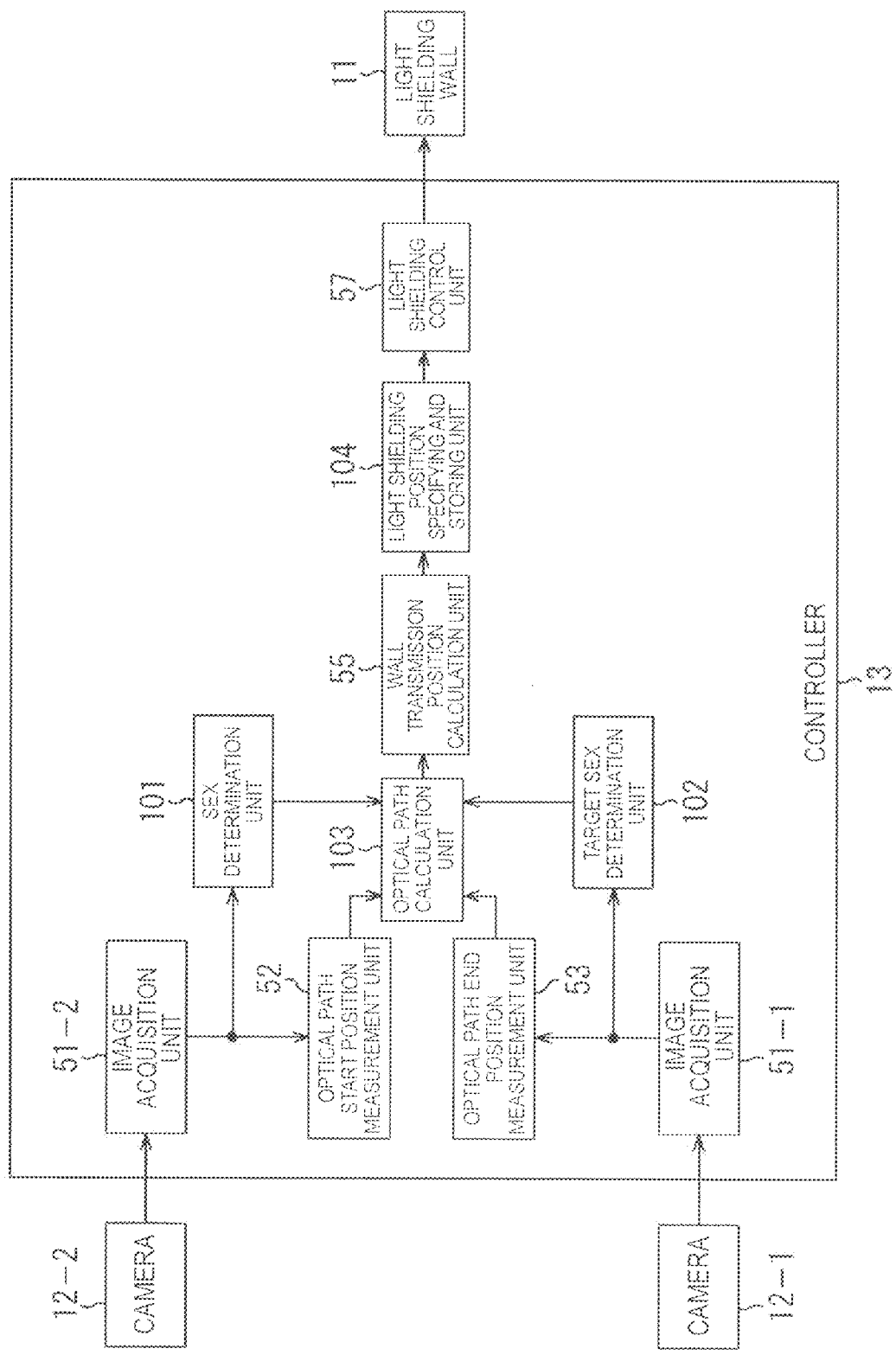
FIG. 10 is a block diagram illustrating an exemplary configuration of a controller of FIG. 9.

Subsequently, referring to the block diagram of FIG. 10, there will be described an exemplary configuration of a controller 13 in the light shielding device of FIG. 9 which is intended to allow what is desired to be viewed to be visible to a person who is supposed to be viewed. The configuration that has substantially the same function as the configuration described above with reference to FIG. 4 is indicated by the same name and reference numeral, and the description thereof is omitted as appropriate. In other words, the controller 13 of FIG. 10 is different from the controller 13 of FIG. 4 in that a sex determination unit 101 and a target sex determination unit 102 are further provided, and an optical path calculation unit 103 and a light shielding position specifying and storing unit 104 are provided instead of the optical path calculation unit 54 and the light shielding position specifying and storing unit 56, respectively.

The sex determination unit 101 determines the sex of a person included in an image which is captured by the camera 12-2 that captures the inside of the second space and is supplied from the image acquisition unit 51-2. More specifically, the sex determination unit 101 specifies the position of a person by searching a facial image in the captured image, extracts features of a male or female from information about the facial image, and determines the sex based on the presence or absence of the features. The features include, for example, the Adam's apple and a beard for a male, and hairstyle or the like for a female. The determination of the sex can further use a body system, clothes, or the like of a person based on the whole body image of the person specified from the facial image.

The target sex determination unit 102 determines the sex of a person that is a target object (hereinafter, referred to as target sex) for each product, that is, whether the product is for men or women for the product included in the image captured by the camera 12-1 that captures the inside of the first space and is supplied from the image acquisition unit 51-1. More specifically, the target sex determination unit 102 determines a target sex based on the design, color scheme, size, or the like of a product. The target sex may be stored previously in association with an image for each product.

The optical path calculation unit 103 is basically similar in function to the optical path calculation unit 54, but the optical path calculation unit 103 calculates an optical path by setting the optical path so that the sex of a person that is the optical path start position may match the target sex of a product that is the optical path end position.

The light shielding position specifying and storing unit 104 is basically similar in function to the light shielding position specifying and storing unit 56, but it is considered that the light shielding position specifying and storing unit 104 controls a panel 21 to which the wall transmission position calculated by the wall transmission position calculation unit 55 belongs to be in a light transmission state and controls a panel 21' to which the wall transmission position does not belong to be in a light shielding state. In other words, since the light shielding device of FIG. 9 is intended to be viewed, a panel 21 that is necessary to be controlled in a light shielding state becomes a panel 21 of the region through which an optical path that is the line of sight does not pass.

[Process of Controlling Light Shielding Wall by Controller of FIG. 10]

Figure 11:
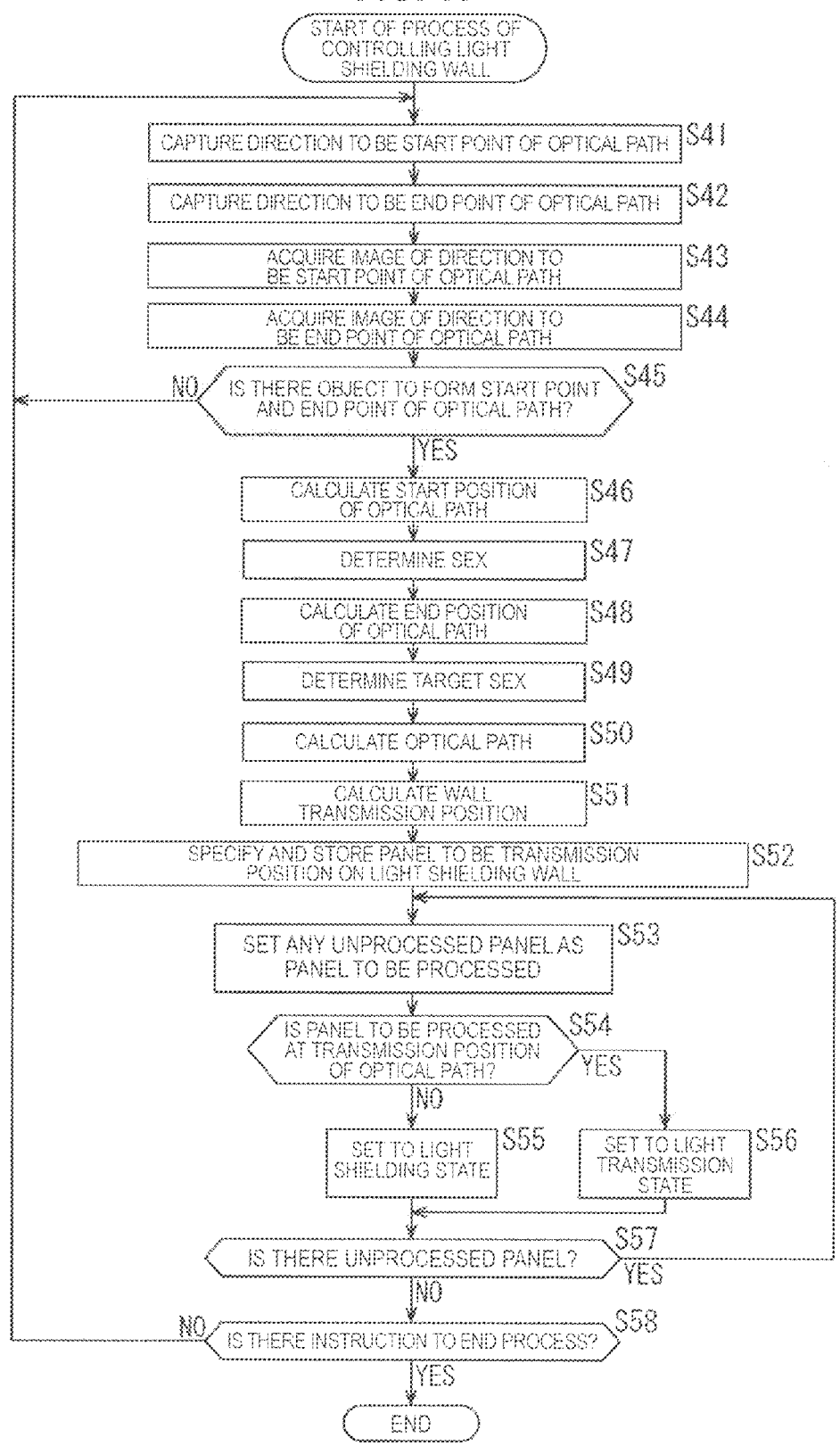
FIG. 11 is a flowchart for describing a light shielding wall control process performed by a controller of FIG. 9, when the light shielding wall is used as a partition of two spaces, which allows an object corresponding to the sex present in one space to be visible in keeping with the sex of a person present in the other space.

Subsequently, referring to the flowchart of FIG. 11, a process of controlling the light shielding wall by the controller 13 of FIG. 10 will be described. The process of steps S41 to S46, S51 to S53, S57, and S58 in the flowchart of FIG. 11 is similar to that of steps S11 to S16, S19 to S21, S25, and S26, respectively, described with reference to the flowchart of FIG. 5, so the description thereof is omitted as appropriate.

In other words, in steps S41 to S45, the camera 12-1 captures an image in the direction that is the end point of the optical path in the first space and supplies the captured image and a distance image to the image acquisition unit 51-1, and the camera 12-2 captures an image in the direction that is the start point of the optical path in the second space and supplies the captured image and a distance image to the image acquisition unit 51-2. Then, the image acquisition units 51-1 and 51-2 acquire the captured image and the distance image supplied from the cameras 12-1 and 12-2, respectively. The image acquisition unit 51-1 supplies the captured image and the distance image to the optical path end position measurement unit 53 and the target sex determination unit 102. In addition, the image acquisition unit 51-2 supplies the captured image and the distance image to the optical path start position measurement unit 52 and the sex determination unit 101. Furthermore, if it is determined that there are a person that is the start position of the optical path and a product that is the end position of the optical path in the respective images, then the process proceeds to step S46.

In step S46, the optical path start position measurement unit 52 measures the optical start position by specifying the position of a person by using a facial image recognition process and further by specifying the position of the eyes of each person, and supplies the measured position to the optical path calculation unit 103.

In step S47, the sex determination unit 101 searches a facial image from the image, determines the sex of each person based on the searched facial image, and supplies the determined result in association with the position at which a person is present to the optical path calculation unit 103.

In step S48, the optical path end position measurement unit 53 specifies an optical path end position in association with the position of the camera 12-1 from the distance information on the distance image, which corresponds to a pixel in the position of the searched product, and supplies the specified optical path end position to the optical path calculation unit 103.

In step S49, the target sex determination unit 102 searches a product from the image, determines a target sex of each product based on the searched product, and supplies the determined result in association with the position at which the product is present to the optical path calculation unit 103.

In step S50, the optical path calculation unit 103 specifies an optical path start position corresponding to the sex, based on the optical path start position supplied from the optical path start position measurement unit 52 and the sex determination result supplied from the sex determination unit 101. In addition, the optical path calculation unit 103 specifies an optical path end position corresponding to the target sex, based on the optical path end position supplied from the optical path end position measurement unit 53 and the target sex determination result supplied from the target sex determination unit 102. Then, the optical path calculation unit 103 calculates an optical path based on the optical path start position and the optical path end position in which the sex determination result matches the target sex determination result.

In step S51, the wall transmission position calculation unit 55 calculates a wall transmission position that indicates a position on the light shielding wall 11 through which the optical path passes based on the information about the optical path supplied from the optical path calculation unit 54.

In step S52, the light shielding position specifying and storing unit 104 specifies and stores the position of a panel 21 that belongs to the wall transmission position from among the panels 21 constituting the light shielding wall 11 based on information about the wall transmission position on the light shielding wall 11.

In step S53, the light shielding control unit 57 sets an unprocessed panel 21 from among the panels 21 on the light shielding wall 11 as a panel to be processed.

In step S54, the light shielding control unit 57 determines whether a panel to be processed is a panel 21 that belongs to the wall transmission position based on information indicating the position of a panel that belongs to the wall transmission position of an optical path that is stored in the light shielding position specifying and storing unit 104. For example, in step S54, if the panel 21 to be processed is not a panel 21 at the light transmission position, then in step S55, the light shielding control unit 57 controls so that the panel 21 to be processed may be in a light transmission state. On the other hand, in step S54, if the panel 21 to be processed is a panel 21 at the light transmission position, then in step S56, the light shielding control unit 57 controls so that the panel 21 to be processed may be in a light shielding state. In other words, in contrast to the case described above with reference to the flowchart of FIG. 5, only the panel 21 at the light transmission position is controlled to be in a light transmission state, and other panels 21' are controlled to be in a light shielding state.

With the process described above, as illustrated in the left portion of FIG. 9, in the second space, if the person H41 who is a male passes by in front of the light shielding wall 11, only the product for men B41 is allowed to be visible, and thus the product B41 that is intended to be visible to only males from among a plurality of products displayed in a display window that is the first space can be allowed to be visible to only males. Similarly, as illustrated in the right portion of FIG. 9, in the second space, if the person H42 who is a female passes by in front of the light shielding wall 11, only the product for women B42 is allowed to be visible, and thus the product B42 that is intended to be visible to only females from among a plurality of products displayed in a display window that is the first space can be allowed to be visible to only females. As a result, it is possible to allow what is desired to be viewed to be visible to a person who is supposed to be viewed, and thus products displayed in a display window can be effectively appealed to the purchasers of the products.

Although there has been described in the above an example in which an optical path is established in association with the sex of a person and the target sex of a product, a person may be separately set according to its classification as well as the sex, and for example, an optical path may be established depending on age group, race, or the like.

3. Third Embodiment

Exemplary Configuration According to Third Embodiment of Light Shielding Device There has been described in the above an example of allowing what is desired to be viewed to be invisible and an example of allowing what is desired to be viewed to be visible to a person who is supposed to be viewed, by controlling the panel 21 constituting the light shielding wall 11 to be any one of a light transmission state and a light shielding state, but for example, it may be possible to display a message on the panel 21 controlled to be in a light shielding state.

Figure 12:
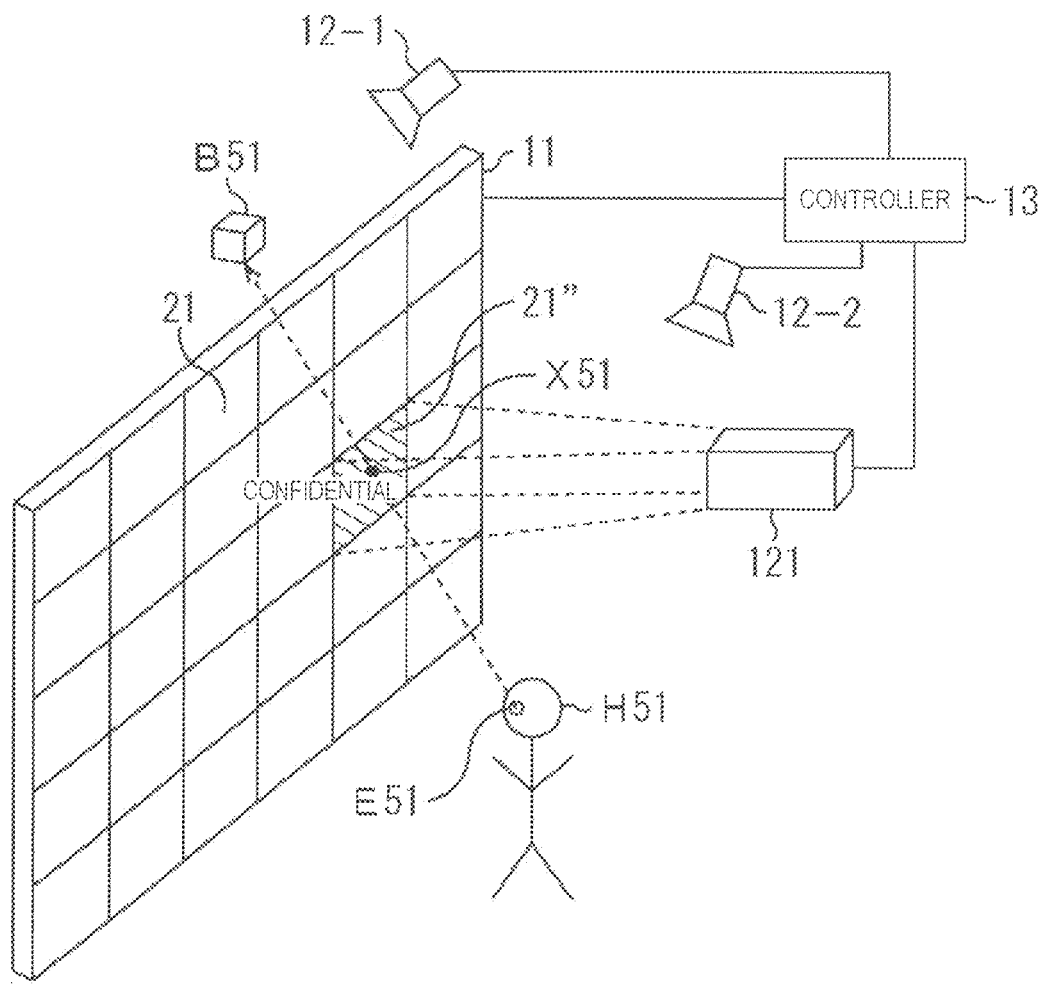
FIG. 12 is a diagram illustrating an exemplary configuration according to a first embodiment of a light shielding device to which the present technology is applied.

FIG. 12 illustrates an exemplary configuration according to a third embodiment of a light shielding device, which allows a message to be displayed on the panel 21 controlled to be in a light shielding state. In the light shielding device of FIG. 12, the configuration that has substantially the same function as the configuration of the light shielding device of FIG. 1 is indicated by the same name and reference numeral, and the description thereof is omitted as appropriate.

In other words, the light shielding device of FIG. 12 is different from the light shielding device of FIG. 1 in that it further includes a projection unit 121 that projects an image in units of panel on the light shielding wall 11. The projection unit 121 is, for example, a projector, and can project a message onto the panel 21 controlled to be in a light shielding state under the control of the controller 13. In FIG. 12, a message marked as "confidential" is displayed on a panel 21" in which an optical path L51 corresponding to the line of sight from the eyes E51 of a person H51 passes through a position X51 of the light shielding wall from among the panels 21 on the light shielding wall 11, and the panel 21" is controlled to be in a light shielding state. Thus, it is possible to recognize that there is an object B51 which is intended to be invisible to the person H51, that is, to be in a confidential state, on the optical path corresponding to the line of sight controlled to be in a light shielding state.

[Exemplary Configuration of Implementation of Controller of FIG. 12]

Subsequently, referring to the block diagram of FIG. 13, there will be described an exemplary configuration of a controller 13 in the light shielding device of FIG. 12 in which a message can be projected onto the panel controlled to be in a light shielding state. The configuration that has substantially the same function as the configuration described above with reference to FIG. 4 is indicated by the same name and reference numeral, and the description thereof is omitted as appropriate. In other words, the controller 13 of FIG. 13 is different from the controller 13 of FIG. 4 in that a projection control unit 131 for controlling the projection unit 121 is provided.

The projection control unit 131 controls the projection unit 121 to project a message that has been set onto the corresponding panel 21, based on the information about the panel 21 that belongs to the position of the intersection point on the light shielding wall 11 of the optical path stored in the light shielding position specifying and storing unit 56.

Figure 13:
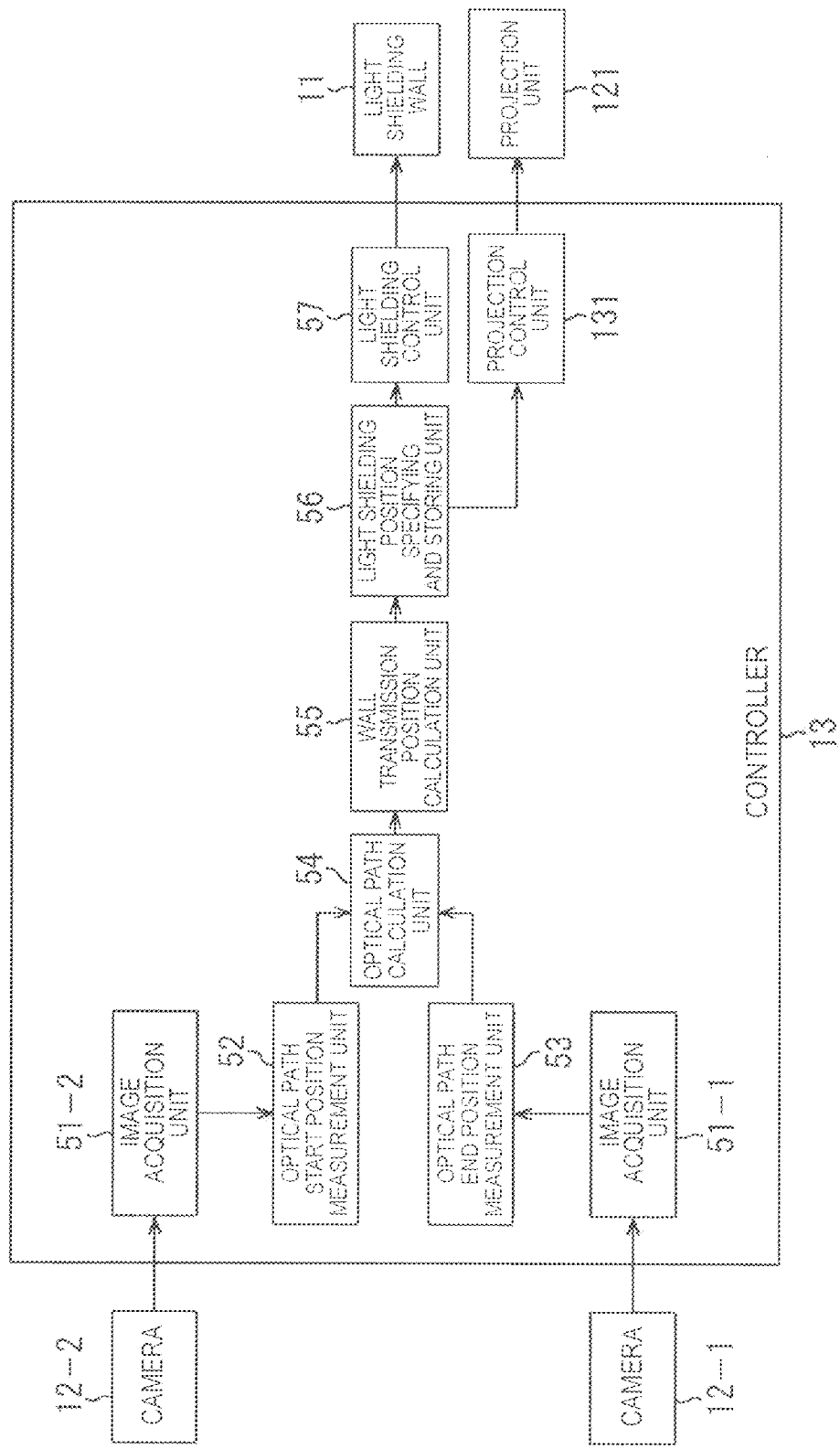
FIG. 13 is a block diagram illustrating an exemplary configuration of a controller of FIG. 12.

[Process of Controlling Light Shielding Wall by Controller of FIG. 13]

Figure 14:
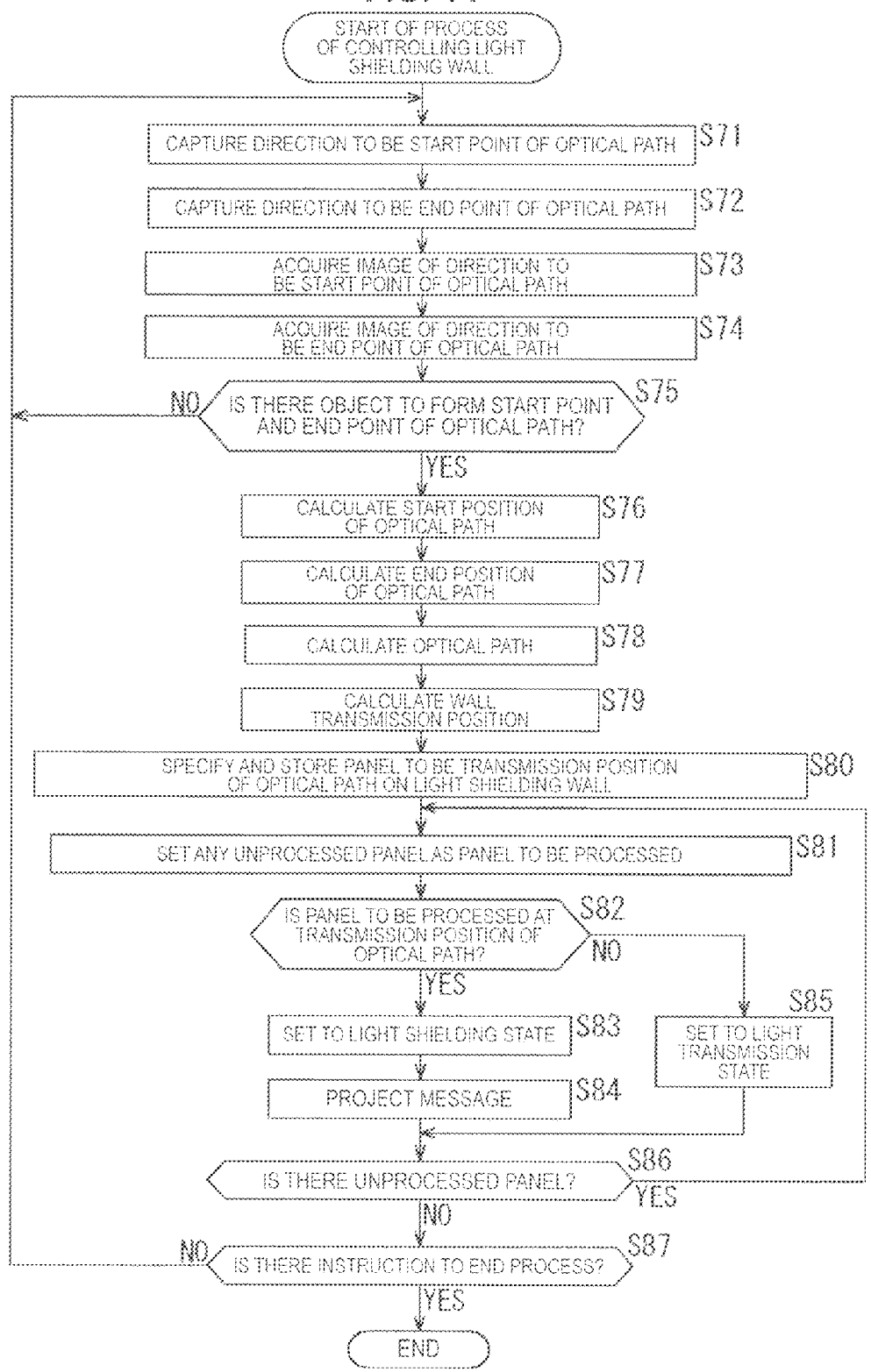
FIG. 14 is a diagram for describing a light shielding wall control process performed by a controller of FIG. 12, when the light shielding wall is used as a partition of two spaces, which allows a message to be projected onto a panel controlled to be in a light shielding state.

Subsequently, referring to the flowchart of FIG. 14, a process of controlling the light shielding wall by the controller 13 of FIG. 13 will be described. The process of steps S81 to S87 except for the process of step S84 of FIG. 14 is similar to the process described above with reference to the flowchart of FIG. 5, thus the description thereof is omitted.

In other words, if a panel to be processed is determined to be a panel 21 that belongs to the position through which the optical path passes by the process of step S82 and the panel to be processed is controlled to be in a light shielding state by the process of step S83, then the process proceeds to step S84.

In step S84, the projection control unit 131 controls the projection unit 121 to project a message previously set onto the corresponding panel 21" as illustrated in FIG. 12, based on the information about the panel 21 that belongs to the position of the intersection point on the light shielding wall 11 of the optical path that is stored in the light shielding position specifying and storing unit 56. In FIG. 12, although there has been illustrated an example in which the message marked as "confidential" is displayed, the message is not limited thereto, for example, a message marked as "under construction" may be displayed.

With the process described above, by displaying a message onto a panel controlled to be in a light shielding state, for example, it is possible to display the reason why it is controlled to be in a light shielding state. The message may have no relation to the light shielding state, for example, in a case of the light shielding device or the like of FIG. 9 applied to a display window, the item description of a product that is visible from a panel 21 controlled to be in a light transmission state may be projected onto the panel 21' controlled to be in a light shielding state. In addition, there has been described in the above an example in which the projection unit 121 is allowed to project a message, but a message may be displayed on the panel 21' controlled to be in a light shielding state and thus not only the display of a message by the projection but also the configuration capable of displaying the panel 21 itself may allow a preset message to be displayed when the panel is controlled to be in a light shielding state.

4. Fourth Embodiment

Exemplary Configuration According to Fourth Embodiment of Light Shielding Device Although there has been described in the above an example in which a message is projected onto a panel controlled to be in a light shielding state, an image may be projected onto a panel 21' controlled to be in a light shielding state. Furthermore, a scene viewed through the panel 21 controlled to be in a light transmission state in the vicinity of the panel 21' controlled to be in a light shielding state is captured, and an image viewed in a case in which the panel 21' controlled to be in a light shielding state is controlled to be in a light transmission state may be generated and projected.

Figure 15:
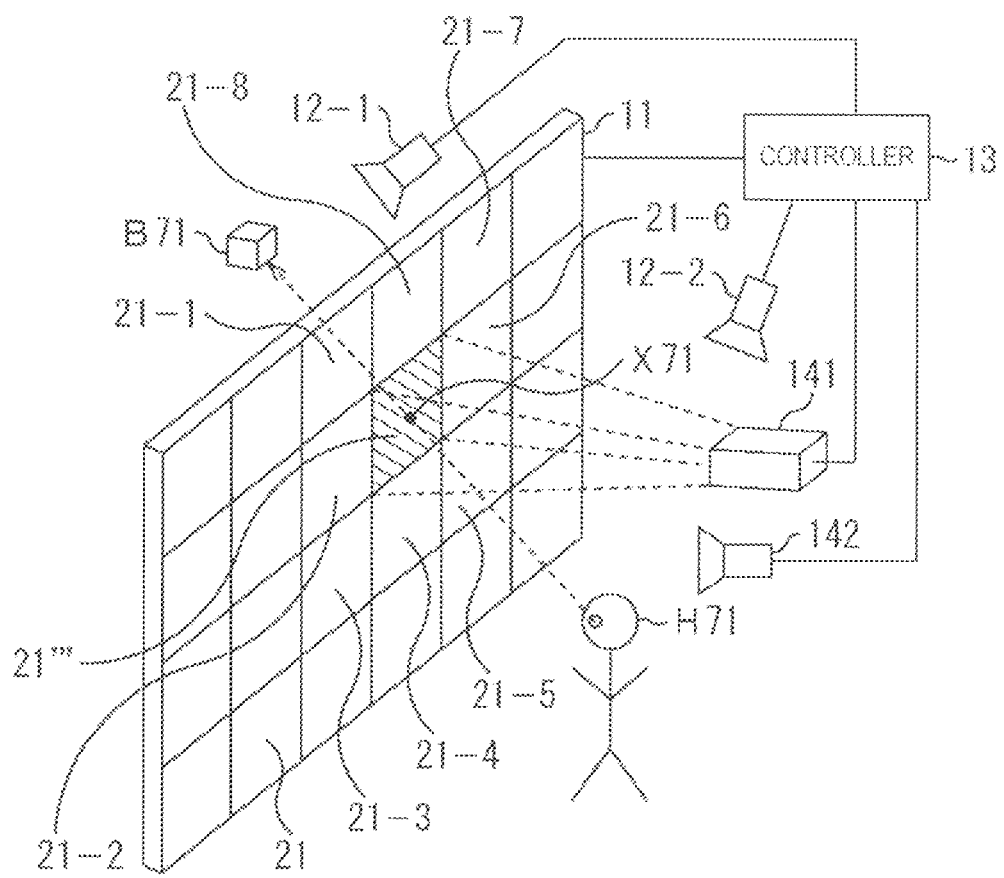
FIG. 15 is a diagram illustrating an exemplary configuration according to a first embodiment of a light shielding device to which the present technology is applied.

FIG. 15 illustrates an exemplary configuration of the light shielding device which captures an image viewed by the light transmission state of the panel 21 controlled to be in a light transmission state in the vicinity of the panel 21''' controlled to be in a light shielding state, generates an image to be viewed like a case in which the panel 21''' is controlled to be in a light transmission state from the captured image, and allows the generated image to be projected onto the panel 21'''. In the light shielding device of FIG. 15, the configuration that has substantially the same function as the light shielding device of FIG. 1 is indicated by the same name and reference numeral, and the description thereof is omitted as appropriate.

In other words, the light shielding device of FIG. 15 is different from the light shielding device of FIG. 1 in that a projection unit 141 and a camera 142 are further provided. The camera 142 captures the entire light shielding wall 11 from the second space and supplies the captured image to the controller 13. The controller 13 of FIG. 15 generates, from among images of a scene viewed through the panel 21 controlled to be in a light transmission state in the vicinity of the panel 21''' controlled to be in a light shielding state from the captured image, an image to be viewed like a case in which the panel 21''' is controlled to be in a light transmission state, for example, by using interpolation, and controls the projection unit 141 to project the generated image.

Thus, for example, as illustrated in FIG. 15, an object B71 is invisible to a person H71 and also the image generated by interpolation using an image of a scene viewed by the person H71, for example, through panels 21-1 to 21-8 that are controlled to be in a light transmission state in the vicinity of the panel 21''' is projected onto the panel 21' controlled to be in a light shielding state, and thus it is possible to allow the person H71 to view a scene that appears as if an object B71 is not present over the light shielding wall 11. As a result, the person H71 is difficult to recognize that the panel 21''' is controlled to be in a light shielding state, and thus the person H71 can be prevented from being conscious of the presence of the object H71 that is not intended to be viewed.

[Exemplary Configuration of Implementation of Controller of FIG. 15]

Subsequently, referring to the block diagram of FIG. 16, there will be described an exemplary configuration of the controller 13 of FIG. 15 in which an image generated by interpolation from the image of a scene viewed through the panels 21 controlled to be in a light transmission state in the vicinity of the panel 21''' is projected onto the panel 21''' controlled to be in a light shielding state. In the block diagram of FIG. 15, the configuration which has substantially the same function as the configuration described above with reference to the block diagrams of FIGS. 4 and 13 is indicated by the same name and reference numeral, and the description thereof is omitted as appropriate. In other words, the controller 13 of FIG. 15 is different from the controllers 13 of FIGS. 4 and 13 in that the controller 13 of FIG. 15 is further provided with an image acquisition unit 151, an image generation unit 152, and a projection control unit 153. The image acquisition unit 151 acquires an image obtained by capturing the entire light shielding wall 11 with the camera 142.

In other words, the image acquisition unit 151 acquires an image obtained by capturing the entire light shielding wall 11 by the camera 142 and supplies the acquired image to the image generation unit 152.

The image generation unit 152 generates an image in which the panel 21''' is to be controlled in a light transmission state based on the image corresponding to the panel 21 controlled to be in a light transmission state in the vicinity of the panel 21''' from among the images supplied from the image acquisition unit 151 based on information which stored in the light shielding position specifying and storing unit 56 about the panel 21''' controlled to be in a light shielding state, and supplies the generated image to the projection control unit 153. The projection control unit 153 controls the projection unit 141 to project the image generated by the image generation unit 152 onto the panel 21''' controlled to be in a light shielding state.

Figure 16:
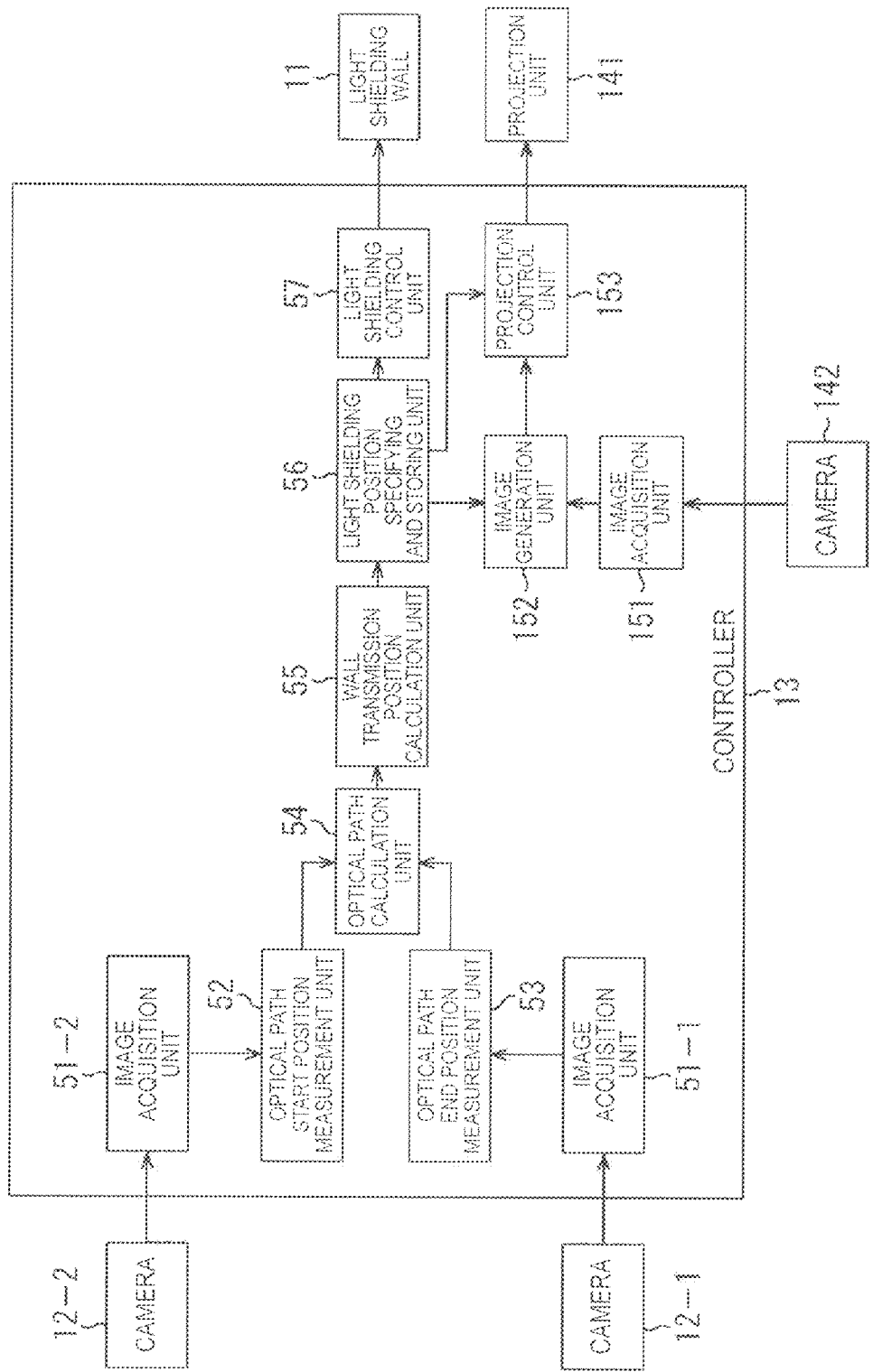
FIG. 16 is a block diagram illustrating an exemplary configuration of a controller of FIG. 15.

[Process of Controlling Light Shielding Wall by Controller of FIG. 16]

Figure 17:
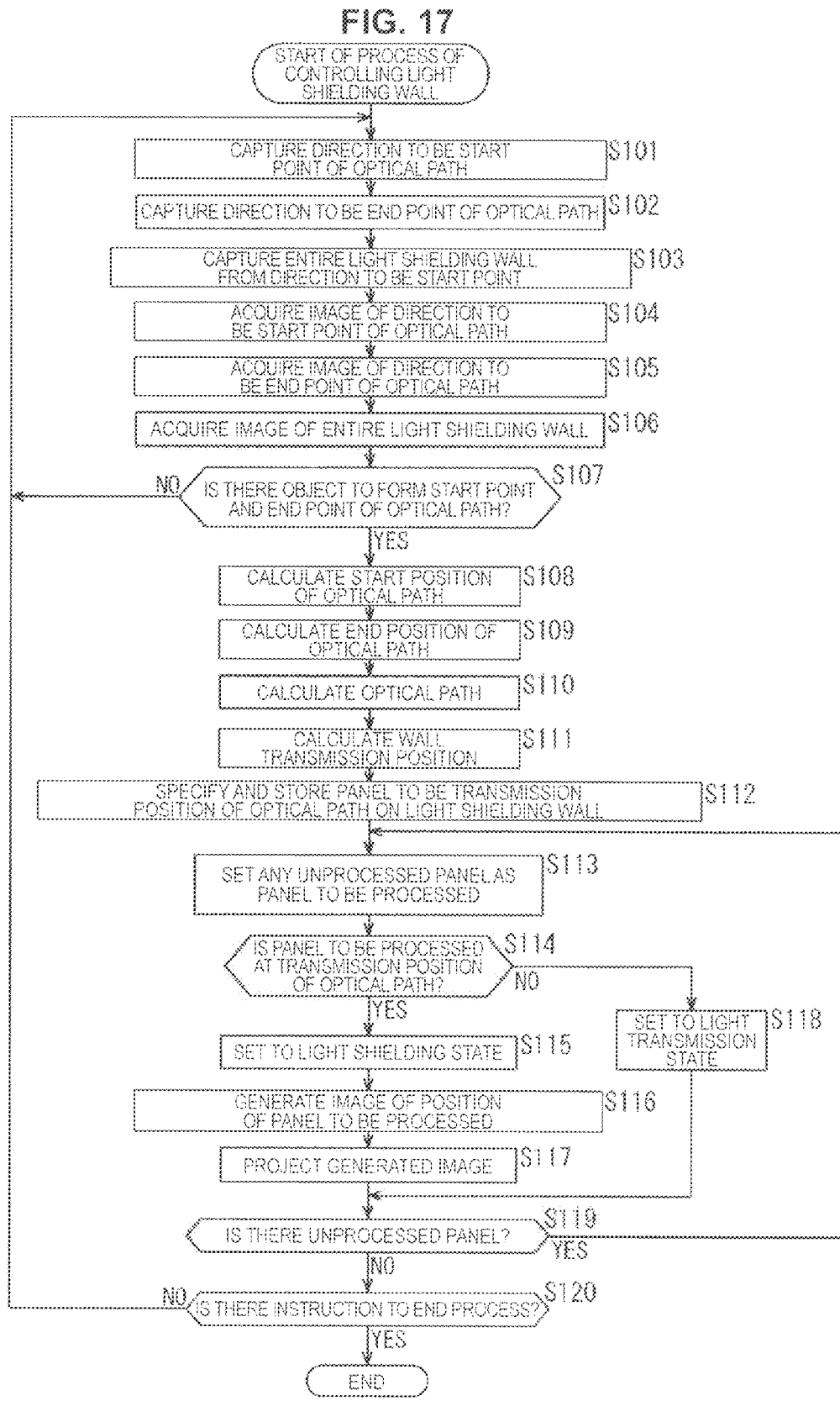
FIG. 17 is a diagram for describing a light shielding wall control process performed by a controller of FIG. 16, when the light shielding wall is used as a partition of two spaces, which allows an image generated based on an image controlled to be in a light transmission state to be projected onto a panel controlled to be in a light shielding state.

Subsequently, referring to the flowchart of FIG. 17, a process of controlling the light shielding wall by the controller 13 of FIG. 16 will be described. The process of steps S101 to S120 except for the process of steps S103, 106, S116, and S117 in FIG. 17 is similar to the process described above with reference to the flowchart of FIG. 5, thus the description thereof is omitted.

In other words, the cameras 12-2 and 12-1 capture an image in steps S101 and S102, respectively.

In step S103, the camera 142 captures the entire light shielding wall 11. The image to be captured in this step is, for example, an image of a scene that is visible from the person H71 over the panel 21 controlled to be in a light transmission state as illustrated in FIG. 15.

In steps S104 and S105, the image acquisition units 51-2 and 51-1 acquire an image from the cameras 12-2 and 12-1, respectively.

In step S106, the image acquisition unit 151 acquires an image of the entire light shielding wall 11 that is captured by the camera 142 and is viewed from the direction of the second space.

In step S107, if it is determined that there is a person or an object in the image supplied from the cameras 12-1 and 12-2, then the process proceeds to step S108.

In step S108, an optical path start position is calculated, and in step S109, an optical path end position is calculated, and in step S110, an optical path is calculated.

In step S111, a wall transmission position is calculated from the calculated optical path.

In step S112, the position information about a panel corresponding to the wall transmission position of the optical path on the light shielding wall 11 is specified and stored.

A panel 21 to be processed is set in step S113, and if it is determined in step S114 that the panel to be processed is a panel through which an optical path passes, then the light shielding control unit 57 controls the panel to be processed to be in a light shielding state in step S115.

In step S116, the image generation unit 152, as illustrated in FIG. 15, generates an image in which the panel 21''' is to be controlled to be in a light transmission state based on the image corresponding to the panel 21 controlled to be in a light transmission state in the vicinity of the panel 21''' from among the images supplied from the image acquisition unit 151 based on the information about the panel 21''' controlled to be in a light shielding state, which is stored in the light shielding position specifying and storing unit 56, and supplies the generated image to the projection control unit 153. In other words, in the case of FIG. 15, if a panel to be processed is the panel 21''', then the image generation unit 152 generates an image viewed like a case in which the panel 21''' is controlled to be in a light transmission state by an interpolation process using images over the panels 21-1 to 21-8 controlled to be in a light transmission state in the vicinity of the panel 21''' from among images of the entire light shielding wall 11.

In step S117, the projection control unit 153 controls the projection unit 141 to project the image generated by the image generation unit 152 onto the panel 21''' which is to be processed and is controlled to be in a light shielding state.

As a result, as illustrated in FIG. 15, the image generated by interpolation based on the image of a scene viewed over the panel 21 controlled to be in a light transmission state in the vicinity of the panel 21''' is projected onto the panel 21''' controlled to be in a light shielding state, thus the object B71 is invisible to the person H71 and even if the object B71 is invisible, the panel 21''' with no sense of discomfort can be visible, accordingly the person H71 can be prevented from being conscious of what is in a state in which is not viewed.

There has been described in the above an example of generating and projecting an image generated by interpolation among from images of landscape viewed over the panel 21 controlled to be in a light transmission state in the vicinity of the panel 21''' controlled to be in a light shielding state, but an image with no sense of discomfort may be generated and projected onto the panel 21 controlled to be in a light shielding state, thus other types of images can be used. For example, an image subjected to a process of erasing the object B71 is generated from an image of a state in which the object B71 is visible before it is controlled to be in a light shielding state and then it may be projected. In addition, the image to be projected onto the panel 21''' controlled to be in a light shielding state is sufficient to be an image with a reduced sense of discomfort with respect to the scene viewed over the panel 21 controlled to be in a light transmission state, and thus, for example, a signboard that was not there originally or an image having a completely different scene may be projected.

In the above, the description is made for the example in which a light shielding wall is a wall used as a partition to separate a room or the like, but it is not limited to a wall, and it may be used for a window, a ceiling, or the like, and it also may be used for a body, window, and the like of a vehicle.

As described above, in accordance with the present technology, it is possible to hide what is intended to be hidden and to intelligibly display what is necessary to be displayed in a visible way.

Incidentally, the above series of processes may be executed by hardware or software. In the case where the series of processes is executed by software, a program constituting the software is installed from a recording medium in a computer incorporated into dedicated hardware or, for example, in a general-purpose personal computer that is capable of executing various functions by installing various programs therein.

Figure 18:
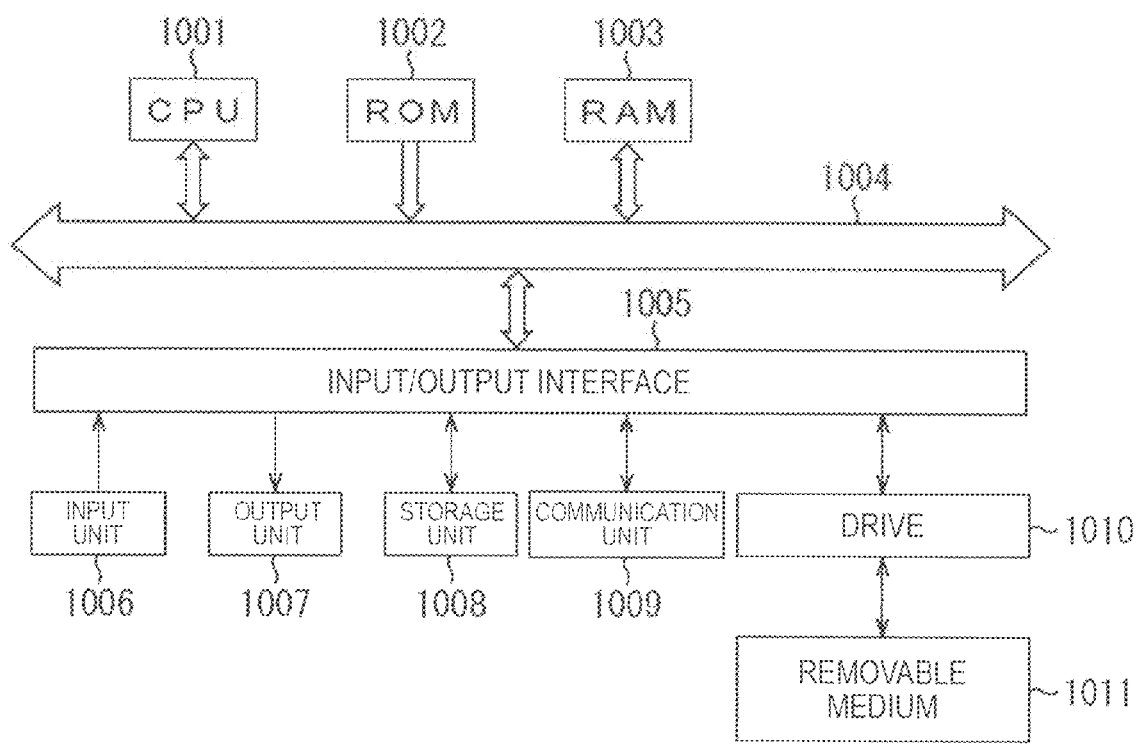
FIG. 18 is a diagram for describing an exemplary configuration of a general-purpose personal computer.

FIG. 18 illustrates an exemplary configuration of a general-purpose personal computer. The personal computer includes a central processing unit (CPU) 1001. An input/output interface 1005 is connected to the CPU 1001 through a bus 1004. A read only memory (ROM) 1002 and a random access memory (RAM) 1003 are connected to the bus 1004.

An input unit 1006 including an input device, such as a keyboard, a mouse, etc., which is used by the user to input an operation command, an output unit 1007 which outputs a process operation screen or an image of a process result to a display device, a storage unit 1008 including a hard disk drive etc. which stores a program or various items of data, and a communication unit 1009 including a local area network (LAN) adaptor etc. which performs a communication process through a network typified by the Internet, are connected to the input/output interface 1005. In addition, a drive 1010 that reads and writes data from and to a removable medium 1011, such as a magnetic disk (including a flexible disk), an optical disk (including a compact disc-read only memory (CD-ROM) and a digital versatile disc (DVD)), an magneto-optical disk (including a mini disc (MD)), or a semiconductor memory, etc. is connected to the input/output interface 1005.

The CPU 1001 executes various processes according to a program stored in the ROM 1002 or a program which is read from the removable medium 1011, such as a magnetic disk, an optical disk, a magneto-optical disk, or a semiconductor memory, etc., is installed in the storage unit 1008, and is loaded from the storage unit 1008 to the RAM 1003. The RAM 1003 also stores data which is required when the CPU 1001 executes various processes, etc., as appropriate.

In the computer configured as described above, the CPU 1001 loads a program that is stored, for example, in the storage unit 1008 onto the RAM 1003 via the input/output interface 1005 and the bus 1004 and executes the program, and accordingly, the above-described series of processing is performed.

Programs to be executed by the computer (the CPU 1001) may be provided being recorded in the removable medium 1011 which is a packaged medium or the like. Also, programs may be provided via a wired or wireless transmission medium, such as a local area network, the Internet or digital satellite broadcasting.

In the computer, by inserting the removable medium 1011 into the drive 1010, the program can be installed in the storage unit 1008 via the input/output interface 1005. Further, the communication unit 1009 can receive the program via a wired or wireless transmission medium and the program can be installed in the storage unit 1008. Moreover, the program can be installed in advance in the ROM 1002 or the storage unit 1008.

It should be noted that the program executed by a computer may be a program that is processed in time series according to the sequence described in this specification or a program that is processed in parallel or at necessary timing such as upon calling.

Further, in the present specification, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

An embodiment of the technology is not limited to the embodiments described above, and various changes and modifications may be made without departing from the scope of the technology.

For example, the present technology can adopt a configuration of cloud computing which processes by allocating and connecting one function by a plurality of apparatuses through a network.

Further, each step described by the above-mentioned flowcharts can be executed by one apparatus or by allocating a plurality of apparatuses.

In addition, in the case where a plurality of processes is included in one step, the plurality of processes included in this one step can be executed by one apparatus or by allocating a plurality of apparatuses.

Additionally, the present technology may also be configured as below.

(1)

A light shielding device including:

a light shielding wall configured to include a plurality of panels, the light shielding wall being used as a partition of a first space and a second space, the plurality of panels being controllable in either a light transmission state in which light is transmitted or a light shielding state in which light is shielded;

an optical path specifying unit configured to specify a predetermined optical path to be passed through the light shielding wall;

a panel specifying unit configured to specify a panel on the light shielding wall, the panel being corresponded to a position at which the predetermined optical path specified by the optical path specifying unit passes through the light shielding wall; and a controller configured to control a light transmission state or a light shielding state for the plurality of panels on the light shielding wall based on information about a panel specified by the panel specifying unit.

(2)

The light shielding device according to (1), further including:

a start position specifying unit configured to specify a start position in the first space from which the predetermined optical path passes through the light shielding wall; and an end position specifying unit configured to specify an end position in the second space at which the predetermined optical path has passed through the light shielding wall, wherein the optical specifying unit specifies the predetermined optical path based on information about the start position specified by the start position specifying unit and the end position specified by the end position specifying unit.

(3)

The light shielding device according to (2), including:

a first image capturing unit configured to capture an image of the first space; and a second image capturing unit configured to capture an image of the second space, wherein the start position specifying unit specifies the start position in the first space from which the predetermined optical path passes through the light shielding wall based on the image captured by the first image capturing unit, and wherein the end position specifying unit specifies the end position in the second space at which the predetermined optical path has passed through the light shielding wall based on the image captured by the second image capturing unit.

(4)

The light shielding device according to (2), wherein the start position is a position of eyes of a person in the first space and the end position is a position of a target which is not intended to be viewed by a person in the second space, wherein the controller controls a panel specified by the panel specifying unit to be in the light shielding state and controls other panels to be in the light transmission state.

(5)

The light shielding device according to (4), wherein the target which is not intended to be viewed by a person in the second space includes a predetermined object or a prescribed portion of a predetermined person, the predetermined object or the predetermined person being present in the second space.

(6)

The light shielding device according to (5), wherein the prescribed portion of the predetermined person includes a face, eyes, or a whole body of the predetermined person.

(7)

The light shielding device according to (2), wherein the start position is a position of eyes of a person in the first space and the end position is a position of a product which is intended to be viewed by the person in the second space, wherein the controller controls a panel specified by the panel specifying unit to be in the light transmission state and controls other panels to be in the light shielding state.

(8)

The light shielding device according to claim 7, further including:

a sex determination unit configured to determine sex of a person in the first space; and a target sex determination unit configured to determine target sex that is sex of a person as a target for a product in the second space, wherein the start position is a position of eyes of a person in the first space and the end position is a position of a product in which sex of the person corresponds with target sex of the product from among products which are intended to be viewed by the person in the second space.

(9)

The light shielding device according to (2), wherein the start position is a position of a target which is not intended to be exposed to direct sunlight in the first space and the end position is a position of a light source of sunlight from the second space, wherein the optical path specifying unit, when a light source of the predetermined optical path is sunlight, regards the sunlight as parallel light rays and specifies the predetermined optical path, based on information about a direction of a predetermined optical path using the sunlight as a light source and the start position, and wherein the controller controls a panel specified by the panel specifying unit to be in the light transmission state and controls other panels to be in the light shielding state.

(10)

The light shielding device according to (1), further including:

a projection unit configured to project an image onto a panel controlled to be in the light shielding state, the projection being performed for each of the panels.

(11)

The light shielding device according to (10), wherein the projection unit projects an image including a message onto the panel controlled to be in the light shielding state, the projection being performed for each of the panels.

(12)

The light shielding device according to (10), further including:

a third image capturing unit configured to capture an image when each panel of the light shielding wall is in the light transmission state in the first space; and an interpolated image generation unit configured to generate an interpolated image of a panel controlled to be in a light shielding state by the controller based on an image captured by the third image capturing unit, wherein the projection unit projects the interpolated image onto the panel controlled to be in the light shielding state, the projection being performed for each of the panels.

(13)

The light shielding device according to (1), wherein the optical path specifying unit specifies a plurality of predetermined optical paths to be passed through the light shielding wall, wherein the panel specifying unit specifies a plurality of panels on the light shielding wall, the plurality of panels being corresponded to positions at which the plurality of predetermined optical paths pass through the light shielding wall, and wherein the controller controls a light transmission state or a light shielding state for the plurality of panels on the light shielding wall based on information about a panel specified by the panel specifying unit.

(14)

A method for shielding light in a light shielding device provided with a light shielding wall configured to be used as a partition of a first space and a second space and configured to include a plurality of panels controllable in either a light transmission state in which light is transmitted or a light shielding state in which light is shielded, the method comprising the steps of:

performing an optical path specifying process of specifying a predetermined optical path to be passed through the light shielding wall;

performing a panel specifying process of specifying a panel on the light shielding wall, the panel being corresponded to a position at which the predetermined optical path specified by performing the optical path specifying process passes through the light shielding wall; and performing a control process of controlling a light transmission state or a light shielding state for the plurality of panels on the light shielding wall based on information about a panel specified by performing the panel specifying process.

(15)

A program for causing a computer, which controls a light shielding device provided with a light shielding wall configured to be used as a partition of a first space and a second space and configured to include a plurality of panels controllable in either a light transmission state in which light is transmitted or a light shielding state in which light is shielded, to execute the processing of:

an optical path specifying step of specifying a predetermined optical path to be passed through the light shielding wall;

a panel specifying step of specifying a panel on the light shielding wall, the panel being corresponded to a position at which the predetermined optical path specified by performing a process of the optical path specifying step passes through the light shielding wall; and a control step of controlling a light transmission state or a light shielding state for the plurality of panels on the light shielding wall based on information about a panel specified by performing a process of the panel specifying step.

REFERENCE SIGNS LIST

11 light shielding wall
12, 12-1, 12-2 camera
13 controller
21, 21-A to 21-C, 21-1 to 21-8, 21', 21", 21''' panel
51, 51-1, 51-2 image acquisition unit
52 optical path start position measurement unit
53 optical path end position measurement unit
54 optical path calculation unit
55 wall transmission position calculation unit
56 light shielding position specifying and storing unit
57 light shielding control unit
101 sex determination unit
102 target sex determination unit
103 optical path calculation unit
104 light shielding position specifying and storing unit
121 projection unit
131 projection control unit
141 projection unit
142 camera
151 image acquisition unit
152 image generation unit
153 projection control unit

The invention claimed is:

1. A light shielding device, comprising:

a light shielding wall configured to include a plurality of panels, the light shielding wall being used as a partition of a first space and a second space, the plurality of panels being controllable in either a light transmission state in which light is transmitted or a light shielding state in which light is shielded;

an optical path specifying unit configured to specify a predetermined optical path to be passed through the light shielding wall;

a panel specifying unit configured to specify a panel on the light shielding wall, the panel being corresponded to a position at which the predetermined optical path specified by the optical path specifying unit passes through the light shielding wall;

a controller configured to control the light transmission state or the light shielding state for the plurality of panels on the light shielding wall based on information about the panel specified by the panel specifying unit, a start position specifying unit configured to specify a start position in the first space from which the predetermined optical path passes through the light shielding wall; and an end position specifying unit configured to specify an end position in the second space at which the predetermined optical path has passed through the light shielding wall, wherein the optical path specifying unit is configured to specify the predetermined optical path based on information about the start position specified by the start position specifying unit and the end position specified by the end position specifying unit.

2. The light shielding device according to claim 1, comprising:

a first image capturing unit configured to capture an image of the first space; and a second image capturing unit configured to capture an image of the second space, wherein the start position specifying unit is configured to specify the start position in the first space from which the predetermined optical path passes through the light shielding wall based on the image captured by the first image capturing unit, and wherein the end position specifying unit is configured to specify the end position in the second space at which the predetermined optical path has passed through the light shielding wall based on the image captured by the second image capturing unit.

3. The light shielding device according to claim 1, wherein the start position is a position of eyes of a person in the first space and the end position is a position of a target which is not intended to be viewed by a person in the second space, wherein the controller is configured to control a panel specified by the panel specifying unit to be in the light shielding state and control other panels to be in the light transmission state.

4. The light shielding device according to claim 3, wherein the target which is not intended to be viewed by a person in the second space includes a predetermined object or a prescribed portion of a predetermined person, the predetermined object or the predetermined person being present in the second space.

5. The light shielding device according to claim 4, wherein the prescribed portion of the predetermined person includes a face, eyes, or a whole body of the predetermined person.

6. The light shielding device according to claim 1, wherein the start position is a position of eyes of a person in the first space and the end position is a position of a product which is intended to be viewed by the person in the second space, wherein the controller is configured to control a panel specified by the panel specifying unit to be in the light transmission state and control other panels to be in the light shielding state.

7. The light shielding device according to claim 6, further comprising:
a sex determination unit configured to determine sex of a person in the first space; and
a target sex determination unit configured to determine target sex that is sex of a person as a target for a product in the second space,
wherein the start position is a position of eyes of a person in the first space and the end position is a position of a product in which sex of the person corresponds with target sex of the product from among products which are intended to be viewed by the person in the second space.

8. The light shielding device according to claim 1, wherein the start position is a position of a target which is not intended to be exposed to direct sunlight in the first space and the end position is a position of a light source of sunlight from the second space,
wherein the optical path specifying unit, in an event a light source of the predetermined optical path is sunlight, is configured to regard the sunlight as parallel light rays and specify the predetermined optical path, based on information about a direction of a predetermined optical path using the sunlight as a light source and the start position, and
wherein the controller is configured to control a panel specified by the panel specifying unit to be in the light transmission state and control other panels to be in the light shielding state.

9. The light shielding device according to claim 1, further comprising:
a projection unit configured to project an image onto a panel controlled to be in the light shielding state, the projection being performed for each of the panels.

10. The light shielding device according to claim 9, wherein the projection unit is configured to project an image including a message onto the panel controlled to be in the light shielding state, the projection being performed for each of the panels.

11. The light shielding device according to claim 9, further comprising:
a third image capturing unit configured to capture an image in an event each panel of the light shielding wall is in the light transmission state in the first space; and
an interpolated image generation unit configured to generate an interpolated image of a panel controlled to be in the light shielding state by the controller based on an image captured by the third image capturing unit,
wherein the projection unit is configured to project the interpolated image onto the panel controlled to be in the light shielding state, the projection being performed for each of the panels.

12. The light shielding device according to claim 1, wherein the optical path specifying unit is configured to specify a plurality of predetermined optical paths to be passed through the light shielding wall,
wherein the panel specifying unit is configured to specify a plurality of panels on the light shielding wall, the plurality of panels being corresponded to positions at which the plurality of predetermined optical paths pass through the light shielding wall, and
wherein the controller is configured to control the light transmission state or the light shielding state for the plurality of panels on the light shielding wall based on information about a panel specified by the panel specifying unit.

13. A method for shielding light in a light shielding device provided with a light shielding wall configured to be used as a partition of a first space and a second space and configured to include a plurality of panels controllable in either a light transmission state in which light is transmitted or a light shielding state in which light is shielded, the method comprising the steps of:
specifying a predetermined optical path to be passed through the light shielding wall;
specifying a panel on the light shielding wall, the panel being corresponded to a position at which the specified predetermined optical path passes through the light shielding wall;
controlling the light transmission state or the light shielding state for the plurality of panels on the light shielding wall based on information about the specified panel,
specifying a start position in the first space from which the predetermined optical path passes through the light shielding wall; and
specifying an end position in the second space at which the predetermined optical path has passed through the light shielding wall,
wherein the predetermined optical path is specified based on information about the specified start position and the specified end position.

14. A non-transitory computer-readable medium having stored thereon a set of computer-executable instructions, when executed by a computer, which controls a light shielding device provided with a light shielding wall configured to be used as a partition of a first space and a second space and configured to include a plurality of panels controllable in either a light transmission state in which light is transmitted or a light shielding state in which light is shielded, cause the computer to perform a method comprising:
specifying a predetermined optical path to be passed through the light shielding wall;
specifying a panel on the light shielding wall, the panel being corresponded to a position at which the specified predetermined optical path passes through the light shielding wall;
controlling the light transmission state or the light shielding state for the plurality of panels on the light shielding wall based on information about the specified panel, and
projecting an image onto a panel controlled to be in the light shielding state, the projection being performed for each of the panels.

15. A light shielding device, comprising:
a light shielding wall configured to include a plurality of panels, the light shielding wall being used as a partition of a first space and a second space, the plurality of panels being controllable in either a light transmission state in which light is transmitted or a light shielding state in which light is shielded;
an optical path specifying unit configured to specify a predetermined optical path to be passed through the light shielding wall;
a panel specifying unit configured to specify a panel on the light shielding wall, the panel being corresponded to a position at which the predetermined optical path specified by the optical path specifying unit passes through the light shielding wall;
a controller configured to control the light transmission state or the light shielding state for the plurality of panels on the light shielding wall based on information about the panel specified by the panel specifying unit, and a projection unit configured to project an image onto a panel controlled to be in the light shielding state, the projection being performed for each of the panels.

\* \* \* \* \*